US011232476B1

(12) United States Patent
Kugler et al.

(10) Patent No.: US 11,232,476 B1
(45) Date of Patent: Jan. 25, 2022

(54) SYSTEM, METHOD, AND COMPUTER PROGRAM PRODUCT FOR TRACKING CALLS

(75) Inventors: Joshua Ezra Kugler, Buffalo Grove, IL (US); Khyle David Keys, Lindenhurst, IL (US)

(73) Assignee: Dialogtech, Inc., Chicago, IL (US)

( * ) Notice: Subject to any disclaimer, the term of this patent is extended or adjusted under 35 U.S.C. 154(b) by 180 days.

(21) Appl. No.: 13/601,447

(22) Filed: Aug. 31, 2012

Related U.S. Application Data

(60) Provisional application No. 61/530,272, filed on Sep. 1, 2011.

(51) Int. Cl.
*G06Q 30/02* (2012.01)
*H04M 3/42* (2006.01)

(52) U.S. Cl.
CPC .......... *G06Q 30/0246* (2013.01); *H04M 3/42* (2013.01)

(58) Field of Classification Search
None
See application file for complete search history.

(56) References Cited

U.S. PATENT DOCUMENTS

| | | | | |
|---|---|---|---|---|
| 7,424,442 | B2 * | 9/2008 | Wong | G06Q 30/02 379/112.01 |
| 8,542,816 | B2 * | 9/2013 | Kaufman | H04M 3/5237 379/265.12 |
| 2007/0124290 | A1 * | 5/2007 | Swanson | G06F 16/951 |
| 2008/0267377 | A1 * | 10/2008 | Siegrist | H04M 7/003 379/201.02 |
| 2008/0275785 | A1 * | 11/2008 | Altberg | G06Q 30/0277 705/14.54 |
| 2011/0231482 | A1 * | 9/2011 | Benna | 709/203 |
| 2011/0282730 | A1 * | 11/2011 | Tarmas | 705/14.42 |
| 2011/0282739 | A1 * | 11/2011 | Mashinsky et al. | 705/14.53 |

OTHER PUBLICATIONS

Linda Bustos, Tracking Affiliate orders for telephone sales, Mar. 17, 2008, Elasticpath, https://www.elasticpath.com/blog/tracking-telephone-affiliate-orders, 2. (Year: 2008).*
Dinan, Bill; Attributing Value to Phone Calls:Dynamic Number Insertion Can Help; Searchengineland. Publication date: Sep. 22, 2009. [retrieved on: Sep. 5, 2021], Abstract, Retrieved from < URL: https://searchengineland.com/attributing-value-to-phone-calls-dynamic-number-insertion-can-help-26339 (Year: 2009).*

* cited by examiner

*Primary Examiner* — George Chen
*Assistant Examiner* — Alfred H Tsui
(74) *Attorney, Agent, or Firm* — Baker Botts L.L.P.

(57) ABSTRACT

A system, method, and computer program product uses an application that allows people who have websites to track phone calls by how they got to the website. JavaScript may be loaded onto the webpage that tracks how a visitor came to the site, and then displays a phone number that is unique to that visitor. When a call comes in, the application determines which visitor called in, based on the number they dialed and other metrics. This allows the application to match the source of the visit to the phone call itself.

11 Claims, 14 Drawing Sheets

Keywords

This feature allows you to display different phone numbers based on the search term used or the referring domain used to navigate to your page. Create a record with the keywords (i.e. car batteries, credit counseling, etc.) or referring domains (i.e. www.google.com), and the corresponding phone number you wish to display when the keyword/domain is used to navigate to your page.

| Rank | Match Type | Match Term | Phone Number | Extension | Notes | Edit | Delete |
|------|-----------|------------|--------------|-----------|-------|------|--------|
| ◊ | Domain | *twitter.com* | (888) 689-1849 | ext 143 | Twitter # | ⊠ | ✗ |
| ◊ | Ad/Campaign | tfn | (866) 596-9037 | Call us now! | Ad Words Toll Free | ⊠ | ✗ |
|   | Default |  | (847) 983-3096 |  |  | ⊠ |  |

Add new Match Term

Ad Preview

| Headline | My Domain: Official Site |
| Description line 1 | My Domain Sample Ad |
| Description line 2 | Sample Ad |
| Display URL | www.mydomain.com |
| Destination URL | http:// www.mydomain.com?ibp-camp=tfn |

My Domain: Official Site
My Domain Sample Ad
Sample Ad
www.mydomain.com

FIG. 9

*Show Options*         SourceTrak Summary

1210 — March 21st, 2011 – March 28th, 2011 — 1205
Summary -> Dynamic Group (All) -> ivrsn
Display: All – Ad/AdGroups – Domains – Keywords — 1215
1220 — Filter: Both – SEO – PPC ◀◀ Page 1 of 2 ▶▶ ▶| — 1225

View 1-100 of 106

| Source Ad/AdGroup | Match Term | Visits | Calls | Unique Calls | Avg. Duration | Conversion Rate |
|---|---|---|---|---|---|---|
| Domain | ivrsn | 171 | 8 | 7 | 10.4 | 4.0% |
| Domain | www.google.com | 131 | 6 | 5 | 5.2 | 4.0% |
| Keyword | telephone survey | 1 | 1 | 1 | 0.1 | 100.0% |
| Keyword | cheap ivr surveys — 180 | 1 | 2 | 1 | 4.6 | 100.0% |
| Domain | www.google.ca | 13 | 1 | 1 | 27.2 | 8.0% |
| Keyword | advanced IVR based on location | 1 | 1 | 1 | 27.2 — 1250 | 100.0% |
| Keyword | o que é ivr | 1 | 1 | 1 | 14.3 | 100.0% |
| Keyword | Telephone Surveys | 2 | 1 | 1 | 6.2 | 50.0% |
| Keyword | ivr surveys | 2 | 1 | 1 | 1.7 | 50.0% |
| Keyword | healthcare ivr applications | 1 | 0 | 0 | 0.0 | 0.0% |
| Keyword | Inbound IVR | 1 | 0 | 0 | 0.0 | 0.0% |
| Keyword | how to start a call center ivr — 1240 | 1 | 0 | 0 | 0.0 | 0.0% |
| Keyword | hosted ivr | 4 | 0 | 0 | 0.0 | 0.0% |
| Keyword | hosted ivr services | 1 | 0 | 0 | 0.0 | 0.0% |
| Keyword | hosted ivr solutions | 1 | 0 | 0 | 0.0 | 0.0% |

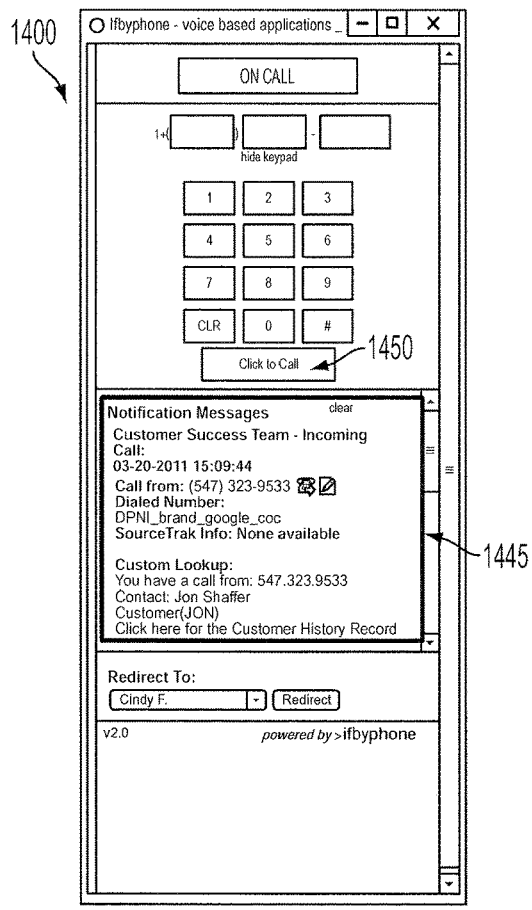
FIG. 14D
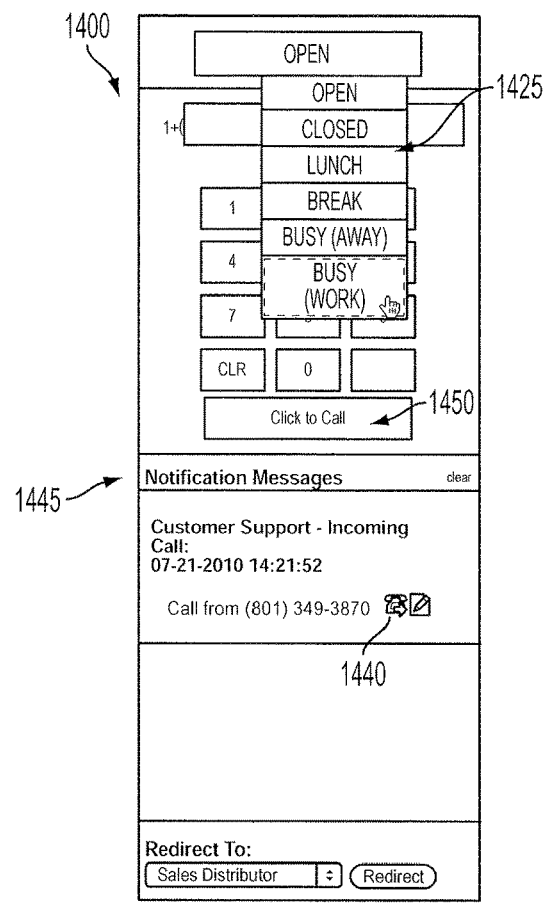
FIG. 14E
FIG. 14F

Post Call Action Configuration

To send detailed call information after every call on your account to a web-accessible server, input the target domain or IP address, optional data, followed by configuring the call detail elements you wish to receive at the completed URL.

Post Call Action Name: 1471 — [testing]

Active: 1472 — ☑

Post Call Action Option: [Call Detail Information ⌄] — 1473

Submit Type: 1474 — [GET ⌄]

Domain: [http://kugler.no-ip.info] — 1475

Page: 1476 — [/ibp_test/pca_log.php]

Static Parameters: [user=josh] — 1477

Include SourceTrak Information: ☑
(See FAQ for details)

Dynamic Parameters: 1479 — ⊕ ⊖

☐ [date_time] = [Date/Time ⌄] — 1480

☐ [first] = [First Action ⌄]

☐ [last] = [Last Action ⌄]

[Save Post Call Action] [Reload Post Call Action] [Cancel]

Manager Control Panel Account Development

| # | Agent | Mode | Time In This Mode | Calls Accepted‡ | Agent Denied‡* | Denied Other‡* | No Answer Or Busy‡* | Average Talk Time‡* |
|---|---|---|---|---|---|---|---|---|
| 1 | Alyssa S. | OPEN | 21:33 | 5 | 0 | 0 | 1 | 6:34 |
| | Michael H. | BUSY(WORK) | 21:21 | 2 | 0 | 0 | 0 | 9:16 |
| 1 | Eric S. | OPEN | 06:30 | 2 | 0 | 0 | 0 | 3:11 |
| | Alyssa S. Cell | CLOSED | > 8 Hours | 0 | 0 | 0 | 0 | 0:00 |
| | Michael H. Cell | CLOSED | > 8 Hours | 0 | 0 | 0 | 0 | 0:00 |
| | Eric S. Cell | CLOSED | > 8 Hours | 0 | 0 | 0 | 0 | 0:00 |

Currently In Queue

| Number | Wait Time |
|---|---|

Total Calls: 0    Avg: 0.00

Call Result Breakdown

| Call Result | % | Avg Wait |
|---|---|---|
| Answered | 58% | 0:40 |
| Hung Up | 25% | 0:18 |
| Time Exceeded | 8% | 5:10 |
| All Agents Closed | 8% | 0:01 |

Queue Statistics‡

| | |
|---|---|
| Longest Hold Time | 5:10 |
| Average Hold Time | 0:54 |
| Total Calls Today | 12 |
| Longest Inb. Talk Time | 29:27 |
| Average Inb. Talk Time | 11:30 |
| Most Calls in Queue Today | 1 |

‡Statistics are updated every minute.    (Refresh)
*Call then returned to queue

FIG. 17

| | Cases Home | | | | | | | Tell me more! \| Help for this Page ② |
|---|---|---|---|---|---|---|---|---|
| View: | Off Hours Queue ⇅ | Go! | Clone \| Create New View | | | | | |

Recent Cases        [New]                                                                                         Recently Viewed ⇅

| Case Number | Organization Name | Status | Contact Name | Type | Case Origin | Date/Time Opened | Owner Name | Subject | Priority |
|---|---|---|---|---|---|---|---|---|---|
| 00005454 | | 90-Closed | | General Support | Phone | 5/25/2012 3:46 PM | XXXXX, Alyssa | Sales Message Left | Medium |
| 00005326 | | 90-Closed | | General Support | Phone | 5/20/2012 9:47 AM | Off Hours Queue | Support Message Left | Medium |
| 00006703 | | 90-Closed | | Demo | Web | 7/22/2012 7:01 AM | XXX, Andrew | Demo Request | Medium |
| 00005221 | | 90-Closed | | General Support | E-mail to case | 5/15/2012 1:43 AM | Off Hours Queue | Daily Prospects Digest for www.ifbyphone.com - 50+ Recent Prospects | Medium |
| 00006063 | | 90-Closed | | General Support | E-mail to case | 6/25/2012 11:21 PM | XXXXX, Michael | Daily Prospects Digest for www.ifbyphone.com - 50+ Recent Prospects | Medium |
| 00006022 | | 90-Closed | | General Support | E-mail to case | 6/23/2012 11:18 PM | XXXXX, Michael | Daily Prospects Digest for www.ifbyphone.com - 6 Recent Prospects | Medium |
| 00002469 | | 90-Closed | | Junk Tickets | E-mail to case | 2/8/2012 1:48 PM | XXXXX, Jason | Data 2.0 Adds Salesforce Data.com, Neustar, and DataStax as partner sponsors! | Medium |
| 00003632 | XXXXXXXXX | 90-Closed | XXXXX | General Support | Phone | 3/21/2012 12:13 PM | XXXXX, Tony | Support Message Left | Medium |
| 00005468 | | 90-Closed | | General Support | Phone | 5/25/2012 7:50 PM | XXXXX, Austin | Support Message Left | Medium |
| 00005360 | | 90-Closed | | General Support | Phone | 5/21/2012 9:32 PM | Off Hours Queue | Support Message Left | Medium |
| 00005353 | | 90-Closed | | General Support | Phone | 5/21/2012 6:39 PM | XXXXX, Michael | Reseller Message Left | Medium |
| 00004424 | XXXXXXXXX | 01-New | XXXXX | General Support | E-mail to case | 4/16/2012 9:53 AM | Marketing Team | Please Update Pricing Info and Screenshots | Medium |
| 00003482 | | 90-Closed | | General Support | Phone | 3/15/2012 10:36 PM | XXXXX, Michael | Sales Message Left | Medium |

FIG. 18

SYSTEM, METHOD, AND COMPUTER PROGRAM PRODUCT FOR TRACKING CALLS

COPYRIGHT NOTICE

Portions of the disclosure of this patent document may contain material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

This application claims the benefit of priority under 35 U.S.C. § 119(e) of U.S. Application Ser. No. 61/530,272, filed on Sep. 1, 2011, and similarly entitled "System, Method, And Computer Program Product For Tracking Calls," the disclosure of which is hereby incorporated by reference in its entirety.

BACKGROUND OF THE INVENTION

Field of the Invention

The present invention in its disclosed embodiments is related generally to customer relationship management (CRM), and more particularly to a system, methods, and computer program products for tracking customer calls.

STATEMENT OF THE PRIOR ART

Various systems, methods, and computer program products for "call tracking" (i.e., the counting and gathering of marketing data on incoming phone calls that have been generated by a website) are known in the prior art. Such systems, methods, and computer program products have typically been designed for the purposes of search engine optimization (SEO), assessing a user's return on investment in a pay-per-click (PPC) environment, lead generation, direct marketing, etc.

As is known, PPC is an Internet advertising model used to direct traffic to websites, where advertisers pay the hosting service when the advertisement is clicked. With search engines, advertisers typically bid on keyword phrases relevant to their target market. Content sites commonly charge a fixed price per click rather than use a bidding system.

In contrast to the generalized portal, which seeks to drive a high volume of traffic to one site, PPC implements the so-called affiliate model that provides purchase opportunities wherever people may be surfing. It does this by offering financial incentives (e.g., in the form of a percentage of revenue) to affiliated partner sites. The affiliates provide purchase-point click-through to the merchant. It is a pay-for-performance model: if an affiliate does not generate sales, it represents no cost to the merchant. Variations include banner exchange and revenue sharing programs.

Websites that utilize PPC ads will often display an advertisement when a keyword query matches an advertiser's keyword list, or when a content site displays relevant content. Such advertisements are called sponsored links or sponsored ads, and typically appear adjacent to or above the organic results on search engine results pages, or anywhere a web developer chooses on a content site.

Among PPC providers, Google AdWords, Yahoo! Search Marketing, and Microsoft adCenter are the three largest network operators, and all three operate under a bid-based model. The cost-per-click or CPC varies depending on the search engine and the level of competition for a particular keyword.

The earliest known PPC search engine proof-of-concept was demonstrated in February 1998 by Jeffrey Brewer of Goto.com at the TED conference in California. His demonstration and the events that followed have been credited with the creation of the PPC advertising system.

Google started search engine advertising in December 1999. It was not until about October 2000 that the AdWords system was introduced, allowing advertisers to create text ads for placement on the Google search engine. However, PPC was only introduced in 2002. Until then, ads were charged at cost-per-thousand impressions.

PPC providers, such as Google, also provide Web analytics solutions (e.g., Google Analytics) that give users insights into the users' website traffic and marketing effectiveness. With Google Analytics, a user is more prepared to write better-targeted ads, strengthen marketing initiatives. and create higher converting websites.

Google has also recently released an SDK for iOS version 1.2, which supports eCommerce tracking, just like its Android counterpart. With eCommerce mobile tracking, a user can capture transaction and product information, send the data to Google Analytics, and then analyze which products performed best.

Notwithstanding these developments, Web analytics solutions according to the prior art have not provided a way to track phone calls by how they got to a given website.

Other products, such as Mongoose Metrics' AccuTrack 1:1, enable users to assign local or toll-free tracking numbers to individual marketing and advertising campaigns, and then collect offline lead conversion intelligence, including phone call date, time, length and caller ID. Call information is automatically associated with a specific campaign, and stored in the user's call tracking dashboard for analysis.

Notwithstanding such advances, call tracking systems according to the prior art have been unable to adequately track customer calls by how they got to a given website.

SUMMARY OF THE INVENTION

Accordingly, it is generally an object of certain embodiments of the present invention to provide a system, methods, and computer program products for tracking customer calls.

More specifically, it is an object of those and other embodiments of the present invention to provide a system, methods, and computer program products for tracking customer calls by how they got to a given website.

The above and other objects are achieved by use of an application that allows people who have websites to track phone calls by how they got to the website. Simple means, such as JavaScript, is loaded onto the webpage that tracks how a visitor came to the site, and then displays a phone number that is unique to that visitor. When a call comes in, the application determines which visitor called in, based on the number they dialed and other metrics. This allows the application to match the source of the visit to the phone call itself.

Further objects, advantages, and novel features of the embodiments of the present invention and the structure and operation thereof, are described in detail below with reference to the accompanying drawings, wherein:

BRIEF DESCRIPTION OF THE DRAWINGS

FIG. 8 depicts a graphical user interface (GUI) for configuring and displaying different phone numbers based on a search term or the referring domain used to navigate to a user's webpage;

FIG. 9 depicts a GUI for configuring and displaying the process of associating a campaign type dynamic number with any link or a PPC campaign;

FIG. 12 depicts a GUI for configuring and displaying reports of the application according to yet another embodiment of the present invention;

FIGS. 14A through 14G depict various GUIs for displaying and configuring an agent panel according to one embodiment of the present invention;

FIGS. 15A and 15B depict agent panels according to an embodiment of the present invention that may be integrated with a sales force automation (SFA) tool such as salesforce.com;

FIG. 16 depicts a GUI for new leads found with the integrated CRM-SFA system shown in FIGS. 15A and 15B;

FIG. 17 depicts a manager control panel which may be used with the integrated CRM-SFA system shown in FIGS. 15A and 15B and FIG. 16; and FIG. 18 depicts another GUI for managing cases in the integrated CRM-SFA system according to FIGS. 15A, 15B, 16, and 17.

DETAILED DESCRIPTION OF THE EMBODIMENTS

Figure 1:
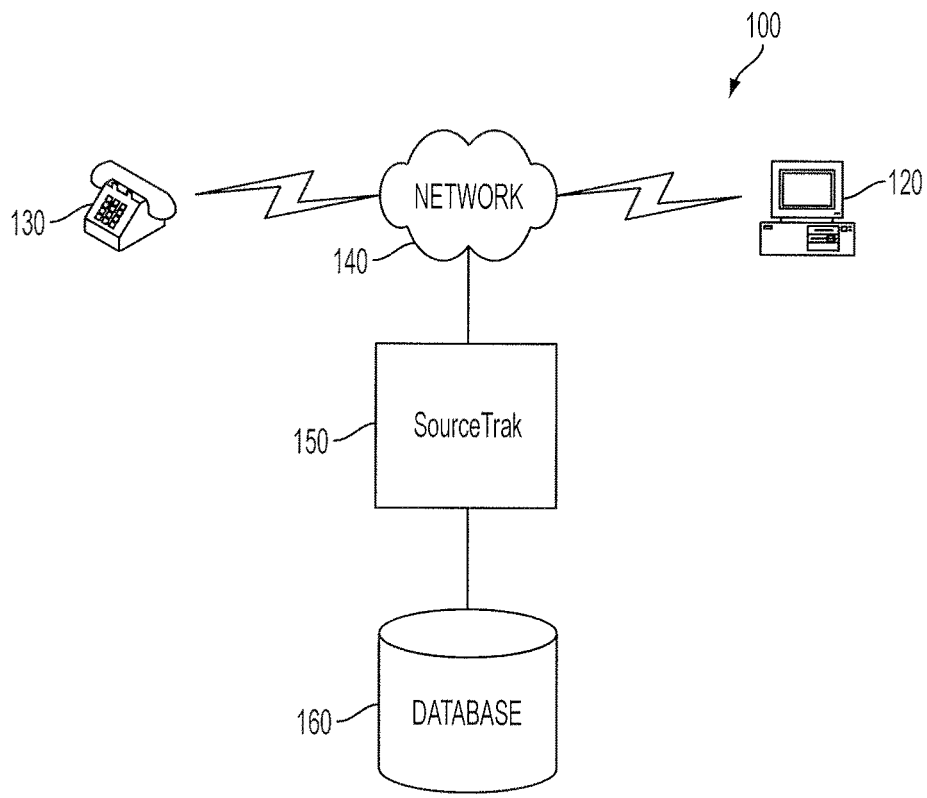
FIG. 1 depicts a simplified block diagram of a customer relationship management (CRM) system for tracking website customer calls according to one embodiment of the present invention.

Exemplary embodiments are discussed in detail below. While specific exemplary embodiments are discussed, it should be understood that this is done for illustration purposes only. In describing and illustrating the exemplary embodiments, specific terminology is employed for the sake of clarity. However, the embodiments are not intended to be limited to the specific terminology so selected. Persons of ordinary skill in the relevant art will recognize that other components and configurations may be used without departing from the true spirit and scope of the embodiments. It is to be understood that each specific element includes all technical equivalents that operate in a similar manner to accomplish a similar purpose. The examples and embodiments described herein are non-limiting examples.

Embodiments of the present invention may include apparatus/systems for performing the operations disclosed herein. An apparatus/system may be specially constructed for the desired purposes, or it may comprise a general-purpose apparatus/system selectively activated or reconfigured by a program stored in the apparatus/system.

Embodiments of the invention may also be implemented in one or a combination of hardware, firmware, and software. They may be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices including thumb drives and solid state drives; and others.

In the following description and claims, the terms "computer program medium" and "computer readable medium" may be used to generally refer to media such as, but not limited to removable storage drives, a hard disk installed in hard disk drive, and the like, etc. These computer program products may provide software to a computer system. Embodiments of the invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Referring now to the drawings, wherein like reference numerals and characters represent like or corresponding parts and steps throughout each of the many views, there is shown in FIG. 1 a simplified block diagram of a customer relationship management (CRM) system 100 for tracking website customer calls according to one embodiment of the present invention.

System 100 is adapted to be accessed by users using one or more clients 120 and one or more phones 130. Such clients 120, in turn, may suitably comprise one or more conventional personal computers, workstations, tablet computers, and the like, operating either as a "fat" client or a "thin" client. It may be understood by those of ordinary skill in the art, that other clients 120, such as Web-enabled hand-held devices, smart phones, and Internet appliances fall within the true spirit and scope of embodiments of the present invention.

Clients 120 of the above types may suitably access system 100 by way of a network 140. By use of the term "network", it should be understood that the foregoing is not intended to limit the present invention to any particular wireline or wireless network, such as local area networks (LANs), metropolitan area networks (MANs), wide area networks (WANs), a public switched telephone network (PSTN), or combinations thereof.

Network 140 may simply comprise the Internet (also known as the "Web" or "World Wide Web"), but it may similarly comprise intranets, extranets, virtual private networks (VPNs), and the like. Because system 100 is also adapted to be coupled to one or more phones 130, network 140 may also comprise a PSTN. As is known, the PSTN is the network of the world's public circuit-switched telephone networks, in much the same way that the Internet is the network of the world's public IP-based packet-switched networks. Originally a network of fixed-line analog telephone systems, the PSTN is now almost entirely digital, and now includes mobile as well as fixed telephones. It is sometimes referred to as the Plain Old Telephone Service (POTS).

Phones 130 may be conventional wireline phones, wireless phones, IP phones, satellite phones, and the like. In accordance with presently preferred embodiments of the invention, system 100 may also comprise an application 150 and a database 160.

As is known, use of the phones 130 by users may provide certain telecommunications features such as Automatic Number Identification (ANI) and Dialed Number Identification Service (DNIS). ANI provides the phone call recipient with the caller's phone number. The technology and method used to provide this information is determined by the service provider, and is often provided by sending DTMF (i.e., digital tone multi frequency) tones along with the call.

Also known as Automated Number Identification or Calling Line Identification (CLI), ANI may arrive over the D channel of an ISDN PRI circuit (out-of-band signaling), or before the first ring on a single line (inband signaling). Caller ID is the local phone company version of ANI, and is usually delivered inband.

In call center applications, ANI displays the number of the caller to the phone representative or agent in real time. Among other things, the call center can use the information to process the call based upon prior history or can forward the call to a different department or organization.

DNIS is a service sold by telecommunications companies to corporate clients that lets them determine which telephone number was dialed by a customer. This is useful in determining how to answer an inbound call. The telecommunications company sends a DNIS number to the client phone system during the call setup. The DNIS number is typically 4 to 10 digits in length.

For example, a company may have a different toll free number for each product line it sells. If a call center is handling calls for multiple product lines, the switch that receives the call can examine the DNIS, and then play the appropriate recorded greeting. Another example of multiple toll free numbers might be used for multi-lingual identification. A dedicated toll free number, for example, might be set up for Spanish speaking customers.

With IVR (i.e., interactive voice response) systems, DNIS may be used as routing information for dispatching purposes, to determine which script or service should be played based on the number that was dialed to reach the IVR platform. For example, 0906 123 4567 and 0906 123 4568 may well both connect to the same IVR system, but one number may be required to provide a competition service and the other might be an information line. The DNIS is what distinguishes these lines from each other and hence the IVR will know which service to provide to the caller.

Figure 2:
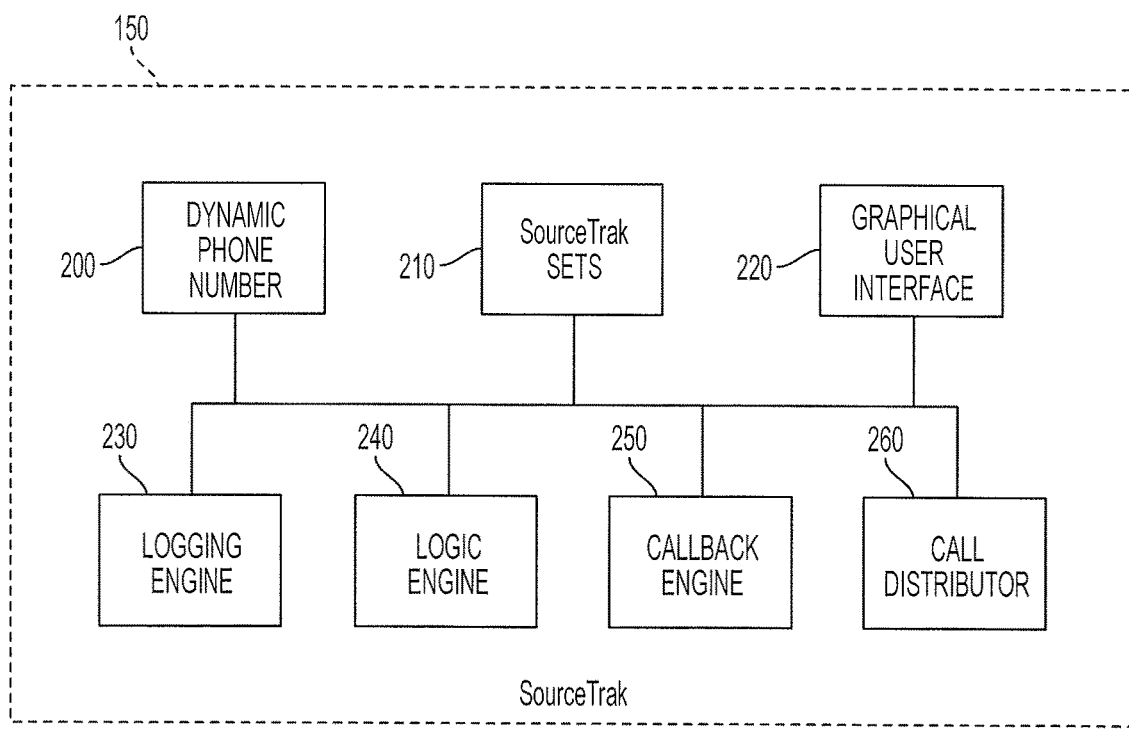
FIG. 2 depicts a block diagram of the tracking set (e.g., SOURCETRAK®) application shown in FIG. 1.

Referring now to FIG. 2, a more detailed depiction of the components of application 150 will now described. Application 150 may comprise a dynamic phone number module 200, a tracking sets module (e.g., SOURCETRAK®) 210, a graphical user interface module 220, a logging engine module 230, a logic engine module 240, a callback engine module 250, and a call distributor module 260.

The principle of dynamic phone number insertion allows a user to display a unique phone number on a website based on the referral source of the traffic. For example, a user could display one phone number on the users website when a visitor arrives at the user's website by clicking on a specific PPC advertisement. A different phone number could be displayed on the user's website when a visitor arrives by clicking a link on a partner's webpage.

These dynamic numbers can be routed to any number the user chooses, allowing the user to track which advertisements and referral sources generate the most phone calls, an important part of return on investment (ROI) that has historically been very difficult to assess. Dynamic phone number module 200 accomplishes this process in the manner shown hereinafter with reference to FIG. 8.

In general, each website is tied to a specific SOURCE-TRAK® set. The SOURCETRAK® sets module 210 contains all configuration information about which phone number to display based on the source of the visit. It comprises a set of rules that match various types of source information to a phone number or group of phone numbers.

There are generally three types of sources: domain, keywords, and AdGroup/Campaign. A domain source generally comprises the domain of the referring web page. A keyword source generally comprises the literal search string, which may be extrapolated from the URL of the referring web page. An AdGroup/Campaign source generally comprises a tag that is appended by users onto the end of their destination URLs in their PPC platform.

Users configure their SOURCETRAK® sets module 210 to look for specific sources and coordinate that source with one or more phone numbers in one of the following configurations: defined source; dynamic group; session group; and main number.

A defined source may comprise a single source (e.g., domain, query string, AdGroup) that displays a single phone number. However, it should be noted that multiple sources can be mapped to a single phone number.

A dynamic group source may comprise a set of defined sources associated with a pool of phone numbers. The tracking sets module (e.g., SOURCETRAK®) 210 rotates through the pool of numbers, displaying a different number to each visitor.

When the system encounters a visitor that has source data, but has not been matched by a defined source or dynamic group, application 150 displays a phone number from this pool. As a result, a new phone number will display to every new visitor. In such circumstances, this comprises a session group.

If no source can be found, then a Main Number displays. The Main Number may be the company's direct line, or another defined phone number. In such circumstances, this comprises a main number source.

Details regarding the graphical user interface module 220, logging engine module 230, logic engine module 240, callback engine module 250, and call distributor module 260 will be described hereinafter with reference to FIGS. 4-7 and 10-14.

Figure 3:
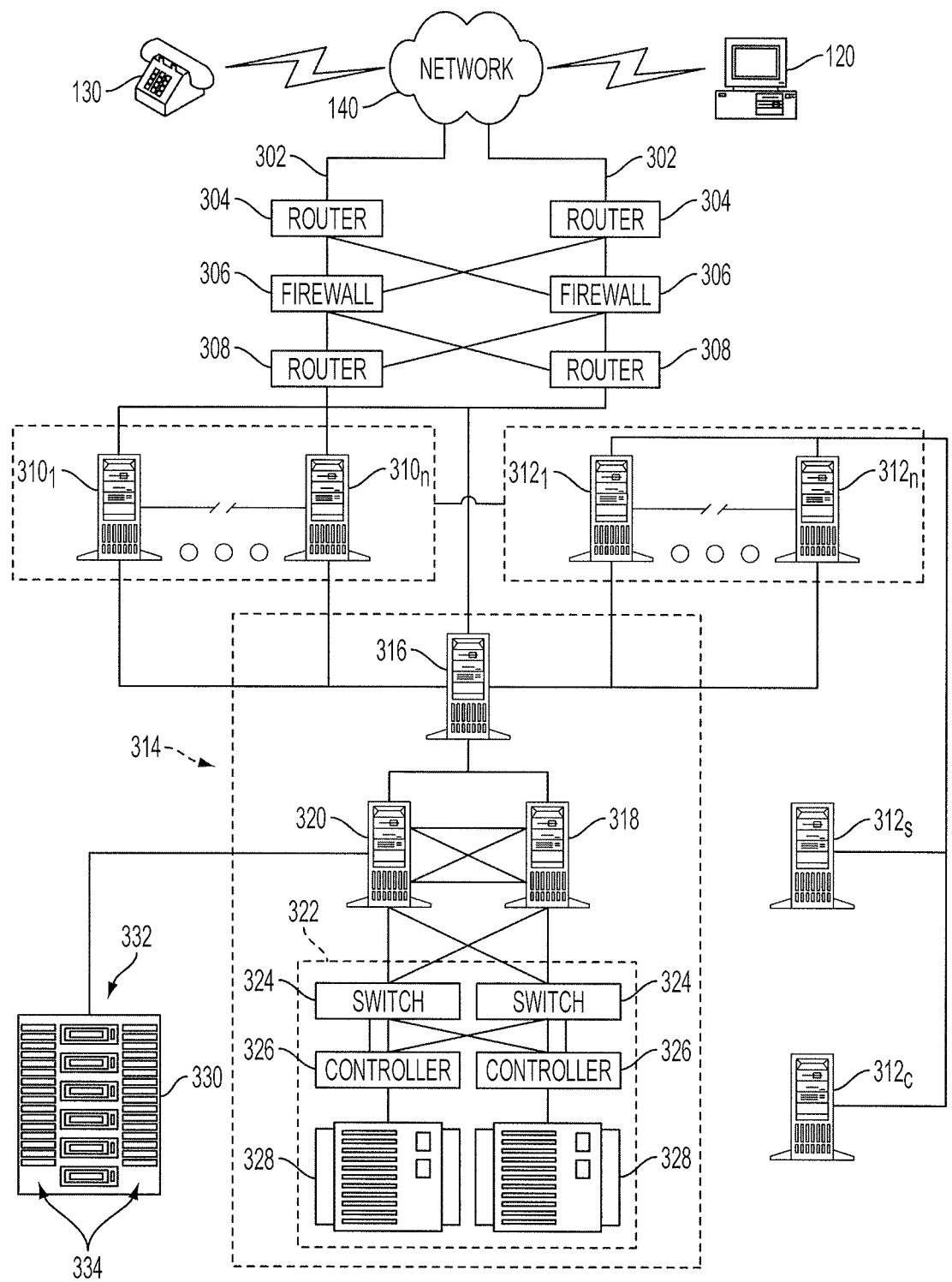
FIG. 3 depicts a block diagram of a CRM system for tracking website customer calls according to another embodiment of the present invention.
Figure 4:
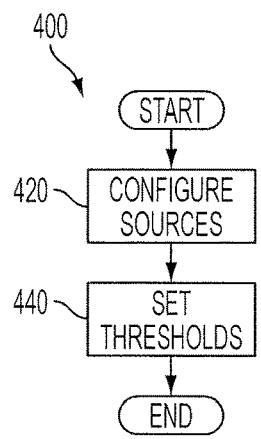
FIG. 4 depicts a simplified flow chart for configuring and setting the application according to one embodiment of the present invention.

As shown in FIG. 3, the architecture of system 100 may also comprise a pair of Internet access lines 302 (e.g., primary and shadow conventional T3 lines), which are cross-connected from the backbone of Internet 140 to one or more, and preferably, a pair of redundant routers 304, 308. Incoming traffic from the first of such routers 304 may then be suitably directed through a firewall 306 to the second of such routers 308. For the sake of redundancy, two firewalls 306 may be cross-connected as shown in FIG. 3.

A plurality of web servers $310_1, \ldots 310_n$ may be conveniently load balanced by use of the foregoing configuration. That is, the load of incoming traffic from the Internet 140, through the routers 304, 308 and firewalls 306, may be balanced among each of the web servers $310_1, \ldots 310_n$, such that: (1) certain incoming traffic may be routed to a particular web server $310_1, \ldots 310_n$, where that particular web server $310_1, \ldots 310_n$ had been recently used by a given user whose information had been cached on that particular web server $310_1, \ldots 310_n$ and, as a result, it would be more efficient to continue to use that particular web server $310_1, \ldots 310_n$; or (2) no single one of the web servers $310_1, \ldots 310_n$ would become overburdened.

Each of the web servers $310_1, \ldots 310_n$ may further comprise a suitable operating system (e.g., Solaris, Windows, HP-UX, AIX, GNU/Linux) and web server software such as, Oracle iPlanet Web Server, which is available on such operating systems and supports JSP and Java Servlet technologies, PHP, NSAPI, CGI, and ColdFusion. Optionally, a certificate server may be installed on each of the web servers $310_1, \ldots 310_n$ to facilitate core digital certificate-issuance and management services, as well as distribution of certificates and certificate-revocation lists to clients and other servers. Other forms of certificate servers (e.g., web certificate servers and wireless certificate servers may likewise be deployed on each of the web servers $310_1, \ldots 310_n$.

System 100 may further comprise a plurality of application servers $312_1, \ldots 312_n$, coupled to the web servers $310_1, \ldots 310_n$. In one embodiment of the present invention, there may be six such application servers. At the same time, a load balance broker (LBB) may be loaded on each of the web servers $310_1, \ldots 310_n$, to facilitate balancing of the load of communications between each of the web servers $310_1, \ldots 310_n$ and each of the application servers $312_1, \ldots 312_n$.

For example, when a request within the application 150 is intended for one of the application servers $312_1, \ldots 312_n$, it can go to one of potentially many instances of the application, which may reside on different machines. The task of ensuring that simultaneous requests are distributed evenly across multiple instances, in order to ensure efficient processing, falls to the LBB.

There are two versions of a load balancing algorithm that may be used by the LBB, one for use without session affinity and one with. In the former case (i.e., without session affinity), when a request is received, the entire list of instances is sequentially searched, starting from the first instance in the list and ignoring any failed instances. The entire list of valid instances, then, is searched for the instance with the lowest usage count. If multiple instances have the same low value, the first one found is used. The only time the search ends prematurely is if an instance with a usage count of zero (0) is found. This is because it is not possible to improve upon this usage count and, thus, this instance is used automatically. At this point in time, the usage count of the instance that is used is incremented.

In the latter case (i.e., with session affinity), the usage count of an instance goes up by one every time it is used to process a request. However, when the request is done, the usage count goes back down by one. In high load situations where multiple requests are submitted with little time in between, multiple instances of the application automatically handle these requests. However, in situations where the requests are somewhat further apart, the usage count of an instance might have time to go back down by the time the next request comes in, allowing a very small number of application server instances to process all the requests. This works well in cases where there is no session affinity. However, because of the characteristic of session affinity always ensuring the same instance of the application to a particular browser session, it would not be prudent to have a small number of application server instances handling multiple requests simply because they are not in quick succession. Toward this end, the LBB has an index pointer into the list of instances in case of session affinity.

When a request comes in and a session cookie is attached (i.e., it is not a first time user), it gets the very same instance which processed the request the last time. There is no load balancing to be performed here. If, however, the request is from a new session, the load balancing algorithm is much the same as without session affinity with a slight modification. The search for the least used application server instance starts with the instance pointed to by the index pointer instead of at the top of the list. Once an instance is used, the index pointer is incremented to point to the next instance in the list, with wrap-around capability, to ensure that the same instance is not bombarded with multiple requests. If a request with a session cookie points to an instance which has failed (or fails at this time) after three (3) retries, the request is treated as if it were a new request and a new session cookie is assigned after load balancing is performed.

There is one primary difference between using session affinity and not doing so as far as load balancing is concerned. Without session affinity, load balancing occurs at each request. The load balancing process with session affinity, however, only occurs at the very first request, since subsequent requests get routed automatically to the same instance every time. Therefore, one of ordinary skill in the art will appreciate the circumstances under which the system 100 of the present invention may require load balancing—with or without session affinity.

Referring again to FIG. 3, it can be seen that beneath the layer of web servers $310_1, \ldots 310_n$ and application servers $312_1, \ldots 312_n$ may be a storage area network (SAN) 314. SAN 314 may comprise a cluster server 316 that is connected to receive incoming Internet traffic through each of the application servers $312_1, \ldots 312_n$, and to transmit outgoing Internet traffic through the routers 304, 308 and firewall 306, from the SAN 314 by way of either a file server 318 or a database server 320. System 100 may further comprise a state server $312_S$ and a content management server $312_C$.

In accordance with another embodiment of the present invention, SAN 314 may also comprise a fiber channel switched network or fabric. It is known, for example, that such networks provide a high-performance, any-to-any interconnect for server-to-server or server-to-storage traffic. Fiber channel switched networks also combine the characteristics of traditional networks (e.g., large address space, scalability) and I/O channels (e.g., high speed, low latency, hardware error detection) on a single infrastructure. Additionally, fiber channel switched networks facilitate multiple protocols for networking (e.g., IP), storage (e.g., SCSI) and messaging (e.g., VIA) over a single infrastructure. This infrastructure can, therefore, be easily used to create SAN 314, in which peripheral devices such as disk storage 328 and tape libraries 332 can be attached to the network and shared among attached nodes.

In another embodiment, file server 318 and database server 320 may be redundantly configured. That is, in the event that either of the servers goes down during a session, the other can assume control of that session with the assistance of the cluster server 316. As a result, the database service may be composed of one or more logical network addresses (e.g., IP), RDBMS software, an underlying file system, a logical volume manager and a set of physical disks being managed by the volume manager. If this service, typically called a service group, needs to be migrated to another node for recovery purposes, all of its resources must be migrated together to re-create the service on another node. A single large node may host any number of service groups, each providing a discrete service to networked clients who may or may not know that they physically reside on a single node.

Service groups can, thus, be managed to maintain service availability through an intelligent availability management tool. Given the ability to test a service group to ensure that it is providing the expected service to networked clients and an ability to automatically start and stop it, such a service group can be made highly available. If multiple service groups are running on a single node, then they must be monitored and managed independently. Independent management allows a service group to be automatically recovered or manually idled (e.g., for administrative or maintenance reasons) without necessarily impacting any of the other service groups running on a node.

Application servers $312_1$ through $312_n$, in concert with the web servers $310_1, \ldots 310_n$, file server 318, database server 320, and the clients 120, provide a conventional three-tiered architecture. As with similar such three-tiered architectures, application servers $312_1$ through $312_n$ handle most of the application processing, such as business logic processing and database integrity processing. The clients 120 only handle interface processing, while the file server 318 and database server 320 only handle database processing. As seen in FIG. 3, the hardware comprising system 100 may be substantially completed with the addition of high-availability storage 322 cross-connected to the file server 318 and database server 320. One suitable such high-availability storage 322 comprises the fiber channel switches 324, a pair of disk controllers 326, and a pair of disk arrays 328. System 100 may further comprise a tape library 330, which includes a plurality of advanced intelligent tape drives 332 (e.g., AIT2 tape drives) and a plurality storage positions 334 for the AIT2 tapes.

In accordance with a presently preferred embodiment of the invention, system 100 will allow for the importation of data surrounding user accounts from the standard network security structure in place. Users of the system may be required to login in order to access the system. Preferably, such login may consist of a User Name and Password. After three unsuccessful login attempts, for example, the system may lock out the user account attempting to login. An administrative level user may then be required to restore a locked out account. Moreover, an active session may be timed out if no activity with the system is detected for a given amount of time (e.g., 30 minutes). The system may log user activity and be capable of reporting other user statistics.

Preferably, system 100 should support the use of the XML markup language. It should also support an extensive array of file types including graphic (e.g., JPEG, GIF, BMP, etc.), audio (e.g., WAV, MP3, etc.), video (e.g., QIC, Real, AVI, MPEG, etc.), and Mixed Media (e.g., SWF, etc.).

Referring now to FIGS. 4-7, various methods to configure system 100 according to embodiments of the present invention will now be described. In general, configuration of the application 150 is accomplished in the manner shown in FIG. 4. A method 400 of configuring application 150 begins by configuring at step 420 the possible sources of callers in the manner described herein above with regards to tracking (e.g., SOURCETRAK®) sets (e.g., SOURCETRAK®) module 210. It ends by setting appropriate thresholds at step 440.

Figure 5:
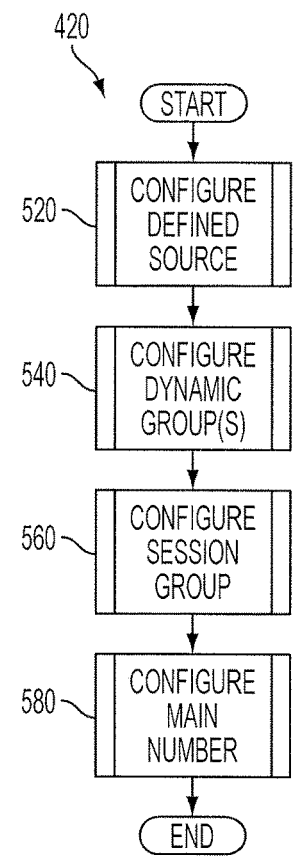
FIG. 5 depicts a more detailed flow chart for configuring the application according to one embodiment of the present invention.

Configuration step 420 may comprise four more specific steps as shown in FIG. 5. It begins by configuring defined sources at step 520. It continues by configuring one or more dynamic groups at step 540, and configuring a session group at step 560. It may end by configuring a main number at step 580.

Figure 6:
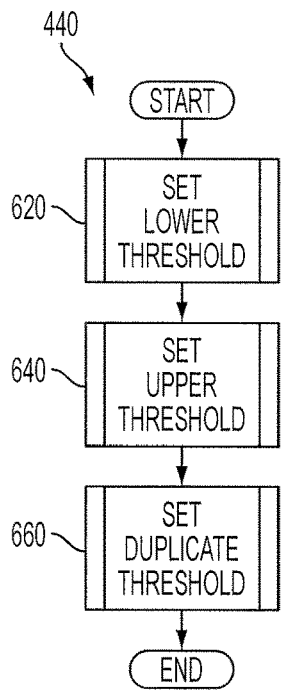
FIG. 6 depicts a more detailed flow chart for setting thresholds within the application according to one embodiment of the present invention.
Figure 7:
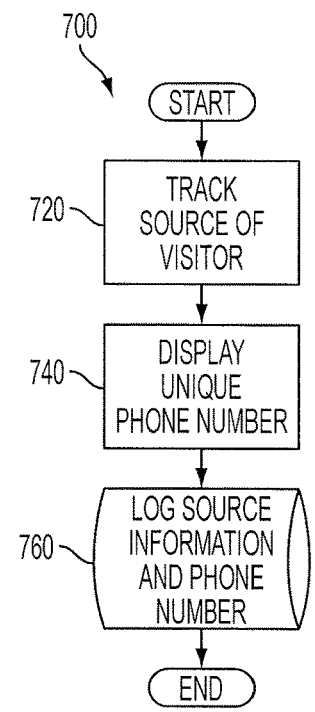
FIG. 7 depicts a simplified flow chart for tracking website customer calls according to one embodiment of the present invention.

When a call comes into system 100, application 150 attempts to match the call with a specific visitor. Application 150 may comprise three thresholds associated with each tracking (e.g., SOURCETRAK®) set that help define how that match may be made. The general step 440 of setting these thresholds is shown in FIG. 6.

A lower threshold may be set at step 620. This lower threshold is the minimum amount of time a phone number should be associated with a visitor. If a particular phone number must be displayed by the system 100 more than once during this lower threshold, it means application 150 cannot be as confident that it matched the proper source.

An upper threshold may be set at step 640. This upper threshold may be determined by how far back in time before a call is made should application 150 look to find a visitor that was displayed that phone number. If there is no display of the phone number dialed within this upper threshold, application 150 will not match the call with a visitor.

A duplicate call threshold may be set at step 660. This duplicate call threshold may be determined by how far back in time before a call is made should application 150 look to check and see if that caller called the same number.

Calls that route through the call distributor module 260 will get associated with a visitor before the call is routed to an agent. All other calls with be associated with an agent immediately upon the completion of the call.

In further configuring system 100, a user need only login to the application 150 with, for example, the user's user ID and password. On a dynamic phone numbers page as shown in FIG. 8, the user may select the "Add new Match Term" button 802 to associate a specific phone number with a referral source. Different numbers may be assigned to individual match terms that can be added via the "Add new Match Term" button. These terms can be configured as one of three types, as determined by a "Match Type" drop-down menu (not shown), which may provide the following options:

Ad/Campaign—This is the most widely used match type for dynamic numbers. The campaign type applies to dynamic number insertion for any link as well as, for example, Google AdWords advertisements and pay-per-click advertisements.

Domain—This will associate a dynamic phone number with a referring domain, for example, www.twitter.com.

Keyword—This will insert a different number on a Web page based on specific search engine keywords.

A "Notes" field 804 may be used as a description to keep track of the user's dynamic numbers. An "Extension" field 806 may be used to display any text that the user would like to next to a particular dynamic number.

The "Rank" 808 or order of the user's match terms is important. If a referral source satisfies two of the user's match terms, the dynamic number with the higher rank will be displayed. Any given match term may be dragged up or down to change its Rank by using its respective vertical spinner 810.

Wildcards, e.g., an asterisk on both sides of a domain match term may be used. Without the use of wildcards in the "Match Term" field 812, only the exact match term result will lead to dynamic number insertion. For example, if the type is domain and the match term is "twitter.com" the only result that will be associated with the phone number is "twitter.com". Other similar terms such as "www.twitter.com" and "http://www.twitter.com/ifbyphone" will not be associated with this number. Using wildcards (*) on both sides of a domain match term, for example "*twitter.com*", would insert the associated dynamic phone number for any referral source that contains "twitter.com".

Referring now to FIG. 9, the process of associating a campaign type dynamic number with any link or a PPC campaign will now be explained. To insert a dynamic number for a PPC advertisement on a Web page, the user may insert a parameter into the "Destination URL" 902. The URL may be entered followed by "?ibp-camp=[insert Ifbyphone match term without brackets]". For example, to display the (866) 596-9037 phone number 814, shown in FIG. 8, on a Web page accessed via the Google AdWords Toll Free campaign shown in FIG. 9, a user may insert "mydomain.com?ibpcamp=tfn" into the destination URL 902 of the ad. It may be noted at this juncture that the match term "tfn" is the match term 816 associated with the dynamic phone number 814 in FIG. 8.

The same protocol may apply to using dynamic number insertion for a campaign match type with any link. To insert the (866) 596-9037 phone number of a user's Website, the user's HTML code for the referring link would look similar to the following:

<a href="http://www.mydomain.com?ibp-camp=tfn">www.mydomain.com</a>

Two segments of code, which are displayed below, may be added to the Web page(s) on which dynamic numbers will be displayed. A first code segment, as shown below, may be inserted into the head section of each of the Web page(s) so desired.

```
<!-- INSERT THIS CODE IN YOUR PAGE HEAD ON EVERY PAGE -->
<script type="text/JavaScript"
src=https://secure.ifbyphone.com
/js/ibp_clickto_referral.js"></script>
<script type="text/JavaScript">
var_ibp_public_key="cdbba50e106e4dbb64c3794fec5e-566921d81315";
var_ibp_formatting=true;
</script>
```

A second code segment, as shown below, may be placed at the position within the Web page where the desired number will be inserted.

```
<!-- INSERT THIS CODE IN YOUR PAGE WHERE YOU WANT A PHONE NUMBER TO DISPLAY -->
<script type="text/JavaScript"
src=https://secure.ifbyphone.com
/js/keyword_replacement.js"></script>
```

As is generally known, there are basically two ways to insert lines of code into the head section of a user's Web pages: (1) by modifying the HTML source code directly (which is a slightly more advanced technique); and (2) by using a web page designer tool such as PageBuilder.

Consider a simple web page whose HTML source code is given below:

```
<html>
<head>
</head>
<body>
<br>
<br>
<p align="center">
IFBYPHONE
</p>
</body>
</html>
```

Inserting lines of code into the head section simply means that the lines of code must be inserted between the <head></head> tags. For example, if a user wanted to insert the first code segment into the head section of the simple web page shown above, its HTML source code would appear as:

```
<html>
<head>
<!-- INSERT THIS CODE IN YOUR PAGE HEAD ON EVERY PAGE -->
<script type="text/JavaScript"
src=https://secure.ifbyphone.com
/js/ibp_clickto_referral.js"></script>
<script type="text/JavaScript">
```

```
    var_ibp_public_key="cdbba50e106e4dbb64c3794fec5-
e566921d81315";
    var_ibp_formatting=true;
    </script>
  </head>
  <body>
    <br>
    <br>
    <p align="center">
    IFBYPHONE
    </p>
  </body>
</html>
```

Web page designer tools (e.g., PageBuilder) also allow a user to insert code into the head section of the user's Web page without having to look at the HTML source code at all. The particulars of how to use such Web page designer tools to accomplish this are well within the knowledge of those of ordinary skill in the art and, thus, need not be described in detail herein.

If a user wanted to insert the second code segment into a similar such simple web page as shown above, its HTML source code might appear as:

```
<html>
  <head>
    <!-- INSERT THIS CODE IN YOUR PAGE HEAD ON EVERY PAGE -->
    <script type="text/JavaScript"
src=https://secure.ifbyphone.com
/js/ibp_clickto_referral.js"></script>
    <script type="text/JavaScript">
    var_ibp_public_key="cdbba50e106e4dbb64c3794fec5-
e566921d81315";
    var_ibp_formatting=true;
    </script>
  </head>
  <body>
    <br>
    <br>
    <p align="center">
    IFBYPHONE
    <p class="appDesc">
    Ifbyphone's Call Tracking application helps you
        track phone calls in Google Analytics alongside
        pageview data. Accurately measure calls from online
        and offline campaigns, including SEO, PPC &
        Social Media, to calculate ROI & capture offline
        conversions. For more info, call
    <script type="text/JavaScript"
src=https://secure.ifbyphone.com
/js/keyword_replacement.js"></script>
    </p><br/>
    <div class="appDesc">
    Here are the steps for using Ifbyphone's Call Track-
ing service:
    <br />
    </P>
  </body>
</html>
```

Figure 10:
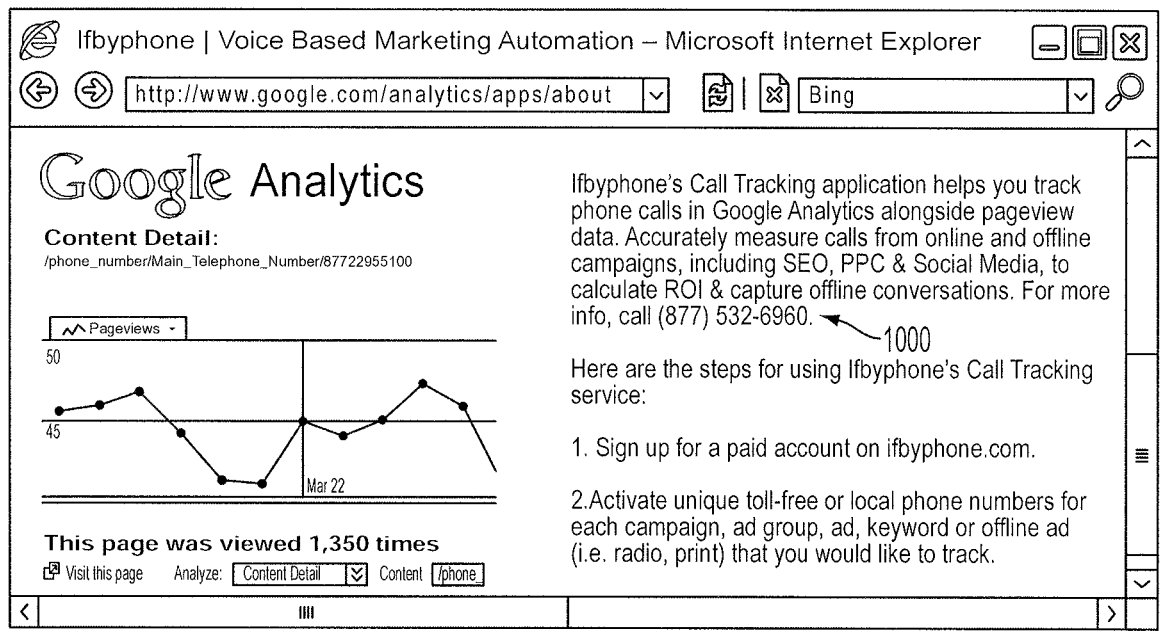
FIG. 10 depicts a GUI for configuring and displaying reports of the application according to one embodiment of the present invention.

FIG. 10 illustrates but one example of how the dynamic number for (877) 532-6960 may be inserted at the position 1000 within the Web page shown.

Dynamic number insertion may work using cookies. When a viewer comes to a user's website on which a dynamic number is displayed, a cookie may be stored in the user's browser for 24 hours. This ensures that if a customer finds the user's website via one of the user's defined match terms, but does not call immediately and then returns to the user's website some time later, the initial referral source may be tracked as generating the call.

It is important to note at this juncture that a user configuring system 100 may clear the user's browser cookies in between testing attempts. Without clearing such cookies, the user will continue to see the same dynamic number for 24 hours.

Referring again to FIG. 7, details of the process 700 used in the logging engine 230 will now be described. Visitors to a website may be tracked by installing the two code segments described herein above on a web page. The first code segment tracks the source of the visitor (e.g., the HTTP referrer, and the base URI of the landing page) at step 720.

The HTTP referrer (which typically occurs as an HTTP header field) identifies, from the point of view of an Internet web page or resource, the address of the web page. This is commonly done so by the Uniform Resource Locator (URL), the more-generic Uniform Resource Identifier (URI), or the internationalization and localization (i18n)-updated Internationalized Resource Identifier (IRI) of the resource which links to it. By checking the HTTP referrer, the new web page can see where the request originated.

Referrer logging may be used to allow websites and web servers to identify where people are visiting them from, for promotional or security purposes. It is also a popular tool to combat cross-site request forgery, but such security mechanisms are weakened by the ease of disabling or forging an HTTP referrer. The HTTP referrer is widely used for statistical purposes, as done so at step 720 within logging engine 230.

A URI is a string of characters used to identify a name or a resource on the Internet. Such identification enables interaction with representations of the resource over a network (typically the World Wide Web) using specific protocols. Schemes specifying a concrete syntax and associated protocols define each URI.

One can classify URIs as locators (URLs), or as names (URNs), or as both. A Uniform Resource Name (URN) functions like a person's name, while a Uniform Resource Locator (URL) resembles that person's street address. In other words: the URN defines an item's identity, while the URL provides a method for finding it.

A URI reference may take the form of a full URI, the scheme-specific portion of one, or even some trailing component thereof, including even the empty string. An optional fragment identifier, preceded by #, may be present at the end of a URI reference. The part of the reference before the #indirectly identifies a resource, and the fragment identifier identifies some portion of that resource.

To derive a URI from a URI reference, software converts the URI reference to "absolute" form by merging it with an absolute or base URI according to a fixed algorithm. The system treats the URI reference as relative to the base URI, although in the case of an absolute reference, the base has no relevance. The base URI typically identifies the document containing the URI reference, although this can be overridden by declarations made within the document or as part of an external data transmission protocol. If the base URI includes a fragment identifier, it is ignored during the merging process. If a fragment identifier is present in the URI reference, it is preserved during the merging process. Web document markup languages frequently use URI references to point to other resources, such as external documents or specific portions of the same logical document.

The second code segment displays a phone number at step 740. When a phone number is displayed, the logging engine 230 logs the source information, as well as other information about the visitor (e.g., IP address, time of display, etc.) at step 760. Such information may be stored in database 160.

In order to match the source of a web site visit to the phone call itself, logic engine 240 may perform the following steps. If the phone number is not in a tracking set (e.g., SOURCETRAK®), it will not be matched to a visitor. If the phone number is in a tracking (e.g., SOURCETRAK®) set but not in a dynamic group or session group, the number will not be matched to a visitor. If a phone number is in a dynamic group or session group in any tracking set, it will attempt to be matched based on the thresholds configured in that set.

Logic engine 240 will first check to see if the caller ID and number dialed for the current call match a previous call, within the time period defined by the duplicate call threshold. If there is a match, logic engine 240 matches the call to the original visitor with the same rank as the original call. It will always attempt to match the caller to the most recent display, assuming there was a display of that phone number within the timeframe determined by the upper threshold.

In matching the call to a visitor, logic engine 240 assigns it a rank over a predetermined range. For example, a range of from 1 to 8 may be used, where 1 represents the highest confidence that logic engine 240 has matched the caller to the correct visitor, and 8 represents the least. The algorithm used to determine such ranks within logic engine 240 may be as follows.

A rank of 1 may be assigned by logic engine 240 where there is a single display of the phone number dialed within the lower threshold, and only one call to that number within that same threshold. A rank of 2 may be assigned by logic engine 240 where there is a single display of the phone number dialed within the upper threshold, and there is only one call to that number within that same threshold. A rank of 3 may be assigned by logic engine 240 where there is a single display of the phone number dialed within the lower threshold, but there are more than one calls to that number within that same threshold. A rank of 4 may be assigned by logic engine 240 where there is a single display of the phone number dialed within the upper threshold, but more than one call to that number within that same threshold.

A rank of 5 may be assigned by logic engine 240 where there is more than one display of the phone number dialed within the lower threshold, but only one call to that number within that same threshold. A rank of 6 may be assigned by logic engine 240 where there is more than one display of the phone number dialed within the upper threshold, but only one call to that number within that same threshold. A rank of 7 may be assigned by logic engine 240 where there are more than one display of the phone number dialed within the lower threshold, and more than one call to that number within that same threshold. Finally, a rank of 8 may be assigned by logic engine 240 where there are more than one display of the phone number dialed within the upper threshold, and more than one call to that number within that same threshold.

The foregoing algorithm may be illustrated in tabular format as follows:

| Rank | Number Of Displays | Number Of Calls | Time Delta Between Most Recent Display And Beginning Of Call |
|---|---|---|---|
| 1 | 1 | 1 | Less than the lower threshold |
| 2 | 1 | 1 | Greater than the lower threshold but less than the upper threshold |
| 3 | 1 | >1 | Less than the lower threshold |
| 4 | 1 | >1 | Greater than the lower threshold but less than the upper threshold |
| 5 | >1 | 1 | Less than the lower threshold |
| 6 | >1 | 1 | Greater than the lower threshold but less than the upper threshold |
| 7 | >1 | >1 | Less than the lower threshold |
| 8 | >1 | >1 | Greater than the lower threshold but less than the upper threshold |

The result is a distinct correlation between visitor and call that is available throughout the system 100.

Figure 11:
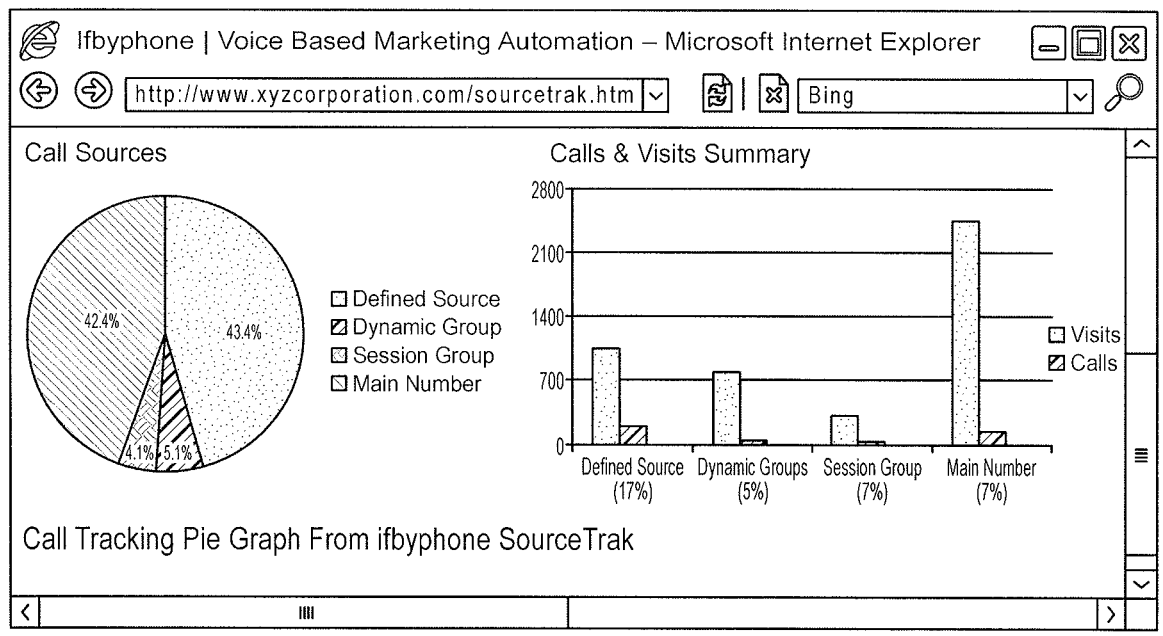
FIG. 11 depicts a GUI for configuring and displaying reports of the application according to another embodiment of the present invention.

With reference now to FIGS. 11-14, one may appreciate the variety of reports and features users of system 100 may access. For example, FIG. 11 depicts a portion of a dashboard showing a pie graph which illustrates the sources of calls, and a bar graph which illustrates the number of visits and calls attributed to such sources.

FIG. 12 depicts a tracking set (e.g., SOURCETRAK®) Summary Report 1200, which quickly details the success rate of campaigns over a one-week time period 1205. Options, such as the type of report, how it is displayed, and filters to be used, can be selected using selectors 1210, 1215, and 1220. In this instance, for example, the PPC filter has been selected. Navigation between the pages of report 1200 may be accomplished using selector 1225.

A plurality of parameters of the calls may be displayed, including the source, match term, visits, calls, unique calls, average duration, and conversion rate. For example, the AdGroup 1230 called "ivrsn" is shown with a Google conversion rate of 4.0%. Also shown are successful keywords 1235 with phone call conversions and unsuccessful keywords 1240 without phone call conversions. The "telephone survey" call 1245, for example, is indicative of a low quality call, while the "advanced IVR based on location" call 1250 is indicative of a high quality call.

This type of report shows call metrics (e.g., number of calls, average duration, unique calls, etc.) associated with aggregated visitor information. This allows users to see what percentage of visitors called in broken out on multiple levels (e.g., organic vs. PPC vs. direct, by AdGroup, by Keyword, etc.). The information shows customers the return on investment they are getting from their PPC campaigns.

Figure 13:
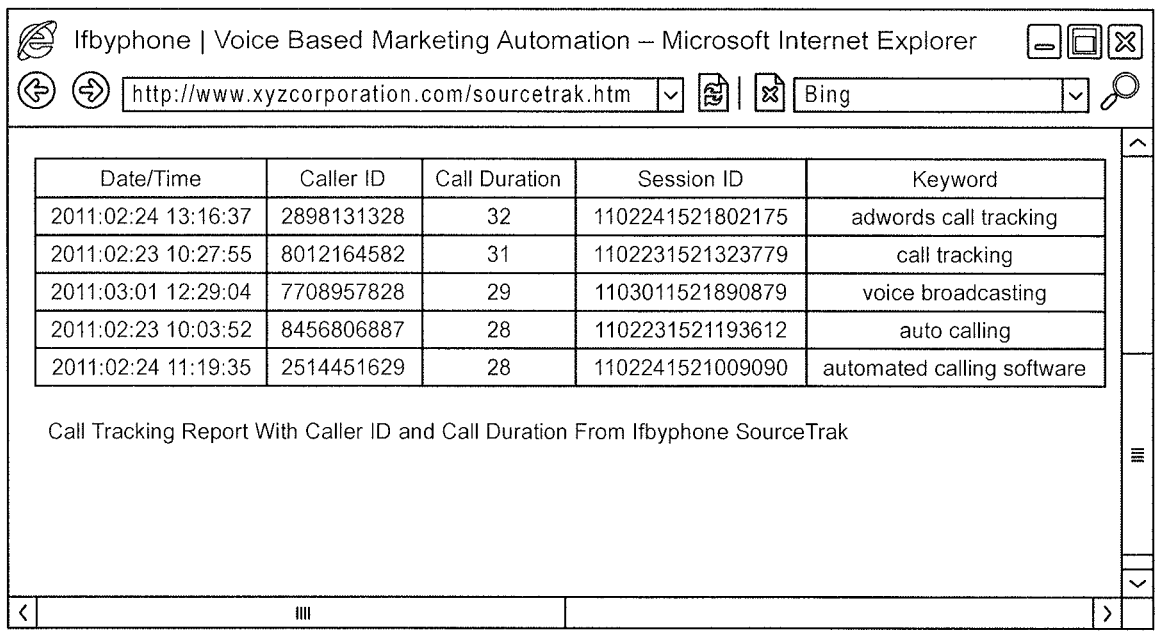
FIG. 13 depicts a GUI for configuring and displaying reports of the application according to still another embodiment of the present invention.

Another type of report is the Call Detail Report. This report may show details such as date and time of each call, its caller ID, call duration, session ID, domain, keyword and AdGroup. An example of such a report is shown in FIG. 13.

Users of the system 100 may also get notifications on their agent panel 1400 as shown in FIGS. 14A through 14G. This may be done by use of call back engine 250, and with or without call distributor module 260. Agent panel 1400 provides information about incoming callers and allows agents to manually adjust their Agent Mode, submit information about calls using Call Note Forms, and transfer callers to different phone numbers or applications using Application Transfers.

Figure 14A:
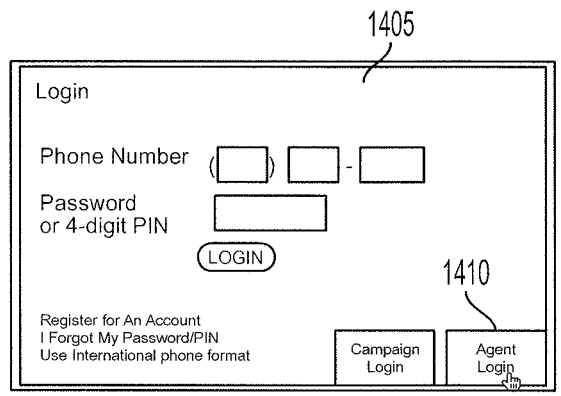
Figure 14B:
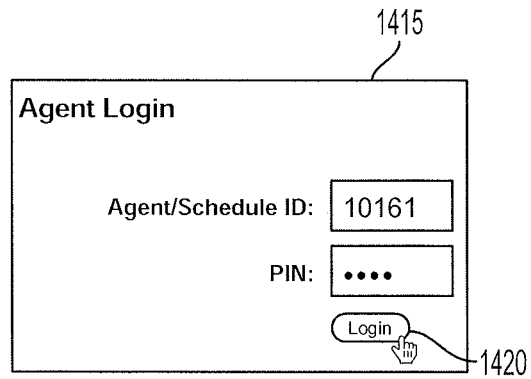

As shown in FIG. 14A, agents may login to agent panel 1400 in the following manner: (1) access system 100 by going to its website and clicking a Login link; (2) on the Login page 1405, click the Agent Login button 1410 in the bottom right; and (3) on the Agent Login page 1415, enter the appropriate Agent ID and PIN and click the Login button 1420.

Agent Modes determine how callers are handled when entering the call distributor module 260 and provide information about how agents spend their time. To select a mode, the user may, for example, hover the user's mouse over the current mode 1425 at the top of agent panel 1400 and select the desired mode from the drop-down list as shown in FIG. 14E.

The following describes various Agent Modes and how they may work. An Open mode indicates that an agent is available and ready to receive calls. If any agents are in the Open mode, callers will bypass the queue and immediately begin transferring to an available agent. As opposed to the Open mode, Active modes are modes which indicate that an agent is actively logged into the call distributor module 250, but not currently available to take a call. If no agents are Open, but at least one agent is in an Active mode, callers may be placed in a queue to wait for an agent to become available.

Active modes comprise "Calling," "On Call," and "Busy (Work)," Calling mode indicates that a call is currently being transferred to the agent. If the call is accepted, the agent's status is automatically set to On Call. If the call goes unanswered, the agent's status is automatically set back to Open. On Call mode indicates that the agent is currently on the phone on a call accepted through the call distributor module 260 or on an outbound call made via the agent panel 1400. When the current call ends, the agent's status may be automatically set back to Open to receive calls. Busy (Work) mode indicates that the agent is actively logged into the system 100 but currently unavailable to take a call. This mode is often used when an agent is engaged in a phone call outside of the call distributor module 260. The Calling and On Call modes cannot be manually selected by an agent or manager. An agent is automatically set to these modes under the appropriate circumstances.

Inactive Modes comprise "Closed," "Lunch," "Break," and "Busy (Away)." These modes indicate that an agent is unavailable to receive calls in the near future. If all agents are in Inactive modes, the caller will be automatically routed to the "No answer action" application (not shown). Closed mode indicates that the agent has signed out for the day and will not receive further calls. Lunch mode indicates that the agent is unavailable on lunch break. Break mode indicates that the agent is unavailable on personal break. Busy (Away) mode indicates that the agent is unavailable, but has not signed out for the day.

To log an outbound call through system 100, an agent must call using an outbound call portion 1430 of the agent panel 1400. The agent can enter the phone number into the number fields 1435 using their keyboard, the numbers on the keypad of their agent panel 1400, or by clicking the phone icon 1440 next to the incoming phone number in the Notification Messages area 1445. Once the number is entered, click the Click to Call button 1450 to initiate the call.

After clicking the Click to Call button 1450, the agent's phone will ring. Upon answering, the agent will hear a prompt stating "connecting your call" and will then be connected to the number entered into the agent panel 1400.

Figure 14C:
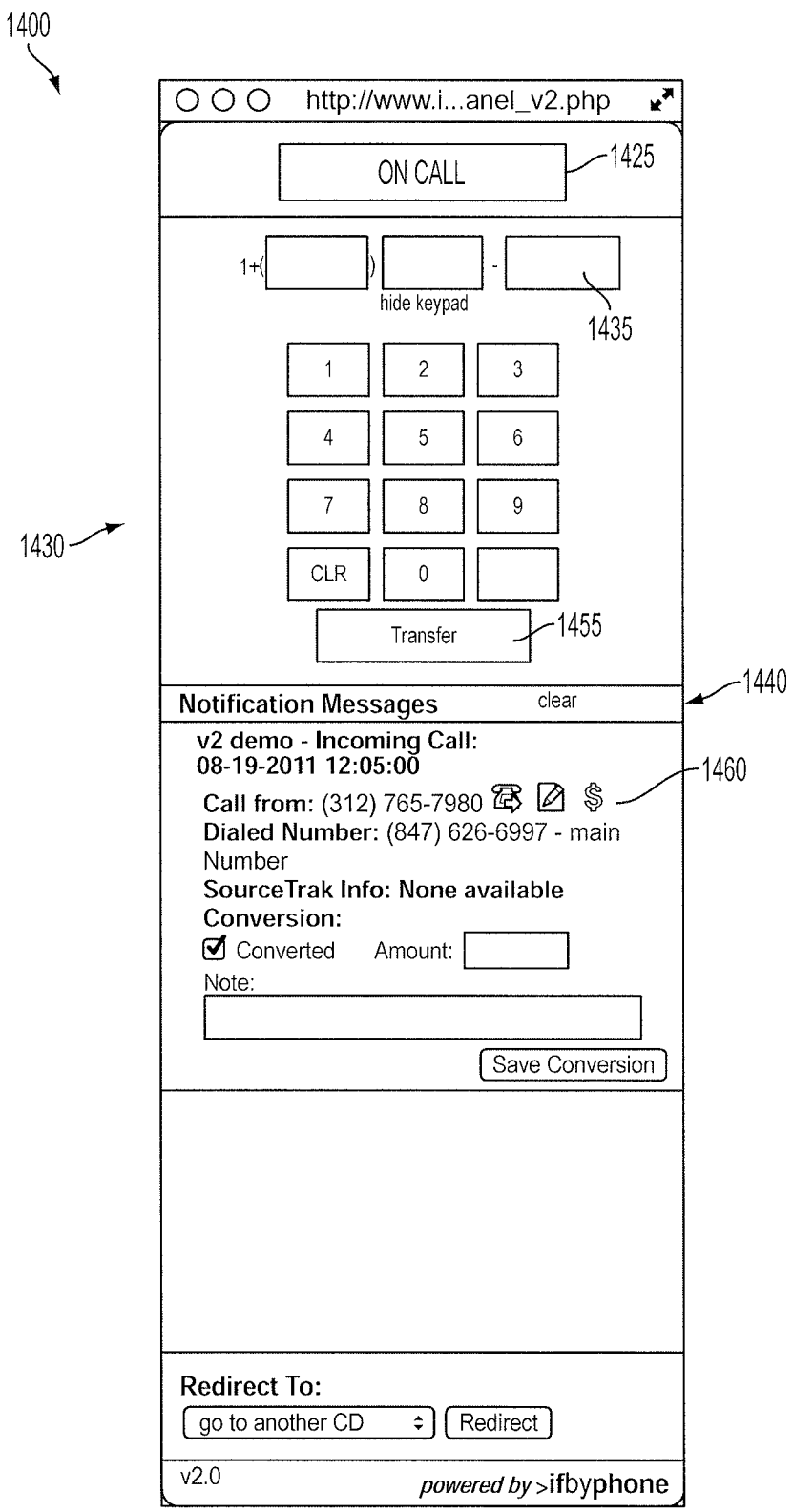

As is also shown in FIGS. 14C-14E, notification messages may be provided to the agent through agent panel 1400. This section of the Agent Panel provides information about inbound calls offered to the agent including the time of the call, the caller's phone number, and any additional Agent Screen Pop information configured by managers on the Call Distributor—Agent Configuration page.

If agents are using Call Note Forms to submit notes about calls, forms can be selected by clicking the paper and pencil icon to the right of the caller's phone number.

Messages sent to agents by managers via the Manager Panel are also displayed in the Notification Messages section.

Application Transfers enable agents to transfer callers to another phone number or application via the Call Distributor Agent Panel. Application Transfers are configured by managers on the Call Distributor—Agent Configuration page. Agents must be on an active call through the Call Distributor to perform an Application Transfer.

While on an active call through the call distributor module 260, an agent can enter a phone number into the dial pad and click the Transfer button 1455 to re-direct the caller to that number. Agents can initiate a pre-configured Application Transfer by using the following steps: (1) Select the desired Application Transfer from the Redirect To dropdown menu; and (2) Click the Redirect button. After redirecting a caller, the agent's status will be automatically set back to Open to receive calls.

As noted above, agent panel 1400 is a web page that agents log into. Whenever a call is routed to them, the application 150 displays information about the caller to that agent. For example, if a visitor is searching for "cheap red staplers," the agent will see that pop-up on her screen before picking up the phone.

FIG. 14F shows an Agent Screen-Pops Configuration panel. A Screen-Pop is information that will be displayed to the agent in the notification section of their agents' panel before they answer the incoming call. This allows them to be more prepared when they answer the call. By selecting "Create New . . . ," one may configure what information will appear in the notification section of the agents' panel: (1) Agent Screen-Pops Configuration Name: Name this particular configuration; (2) Reverse Directory Lookup (charges apply): Check this box to have the system lookup the incoming phone number to find address and name information. A fee may apply even if the system does not find any information; (3) SalesForce.com Lookup: Check this box; then input the user's SalesForce login and password, to have the system pull the contact information for the incoming phone number from the user's SalesForce account; (4) Do Your Own Lookup Mashup: Using some custom code in conjunction with the user's customer relationship manager system, a user can configure the system to lookup information on the caller based on their phone number. The desired Agent Screen-Pops Configuration may be selected from the drop down menu.

Further details regarding integration of system 100 with sales force automation (SFA) tools such as salesforce.com will be set forth in regards to FIGS. 15-18.

Call distributor module 260 may further comprise the ability to integrate information from the application 150 and use it within a separate CRM system. To this end, a "Post Call Action" feature will hit a web page with information about every call. This may include all relevant information about the visitor.

Call distributor module 260 may further comprise a Conversion feature. When they do this, their agents can mark a call as "sold" or "not sold," the amount of the sale, and general notes on the call. Such fields, in addition to the tracking set (e.g., SOURCETRAK®) information, are available from a Call Detail Report, in the manner of the dashboards shown in FIGS. 11-13. This allows customers to track close rates and revenue by source.

According to yet another embodiment of the system of the present invention, a Post Call Action feature may also be used. The goal of Post Call Action is to give users real-time data collection abilities for calls as they complete, with a myriad of call detail information at their fingertips. Functionally, the post call action interface assists the user to generate a fully-qualified web URL which is then "filled in" with the dynamic information corresponding to the call that the user wants and launching a "REST" API call to a specified web server. This will deliver the desired data in near real-time as each call completes. The data reported by a Post Call Action can be simple or complicated—a powerful capability leveraging the same everyday technology used to surf the web.

Calls can have multiple Post Call Actions, further empowering any and all interested parties with only the information they need.

Post Call Action gives a user the ability to specify "dynamic parameters" in the URL that act as placeholders for call-specific data. These so-called placeholders are chosen in the Post Call Action configuration interface from a dynamically-generated list based on the value of the "Post Call Action Option" drop-down list. It can be as easy as adding a new dynamic parameter, inputting an identifier for it in the newly available text box, and choosing one of the dynamic placeholder values from the corresponding drop-down list. When a Post Call Action is executed, these placeholder values are first substituted with the corresponding pieces of call-specific information before the process is completed. The system fills in the blanks. As many or as few of the available placeholders can be used, in any order.

Setting Up Post Call Actions

Post Call Action configuration may be accessed by clicking Developer Tools and then Post Call Actions. As mentioned above, a user can have multiple Post Call Actions. To create one, the user need only click the "Create a new Post Call Action" link or other appropriate means.

The Post Call Action may be named in box 1471, and leave the Active box 1472 checked. A user can disable it at anytime without having to delete it by un-checking the Active box 1472 and saving.

A Post Call Action Option 1473 may be left on "Call Detail Information" for now. A "Google Analytics®" option (not shown) may be used to send call information to the user's Google Analytics® account as explained in greater detail herein below.

A user may set the Submit Type 1474 to either GET or POST depending on the user's needs.

The Domain 1475 is the domain portion of the URL for the user's server. In the example shown in FIG. 14G, it is "http://kugler.no-ip.info".

The Page field 1476 is the name of the file on the user's server that will be processing the information submitted from the NetGet. This is the page that will be sending back a response depending on the NetGet Action selected above. The Page field 1476 can contain sub-folders if the user's file does not exist at the root level of the user's web server. For example, if the user's page resides at "http://www.kugler.no-ip.info/ibp_test/pca_log.php" the user would enter "/ ibp_test/pca_log.php" in the Page field 1476.

Voice forms known as "SurVos" may be used to create dialogs over the telephone between callers and a system, much like a Web form with voice recognition capabilities. Such voice forms may be used to provide or collect information. At the completion of a voice form, the information collected can be emailed, saved to a database or transmitted for further processing. A SurVo can be utilized to conduct employment screens, provide a customer satisfaction survey or route a call based on a user's answers to a series of questions. SurVos have the potential to be invoked in response to a Smart Click-to-Call, an inbound call, an outbound call (e.g., voice broadcast), a scheduled call, or an API request from a Web site. Static Parameters do not depend on any actions taken by the SurVo. They are useful when a user has some data or token the user would like to send along. Further details regarding SurVo may be found in the SurVo Advanced User's Guide (Version 2.6), which is incorporated herein by reference.

For example, if the user would want to interact with six separate SurVo Smart Forms, and the user would further want a plain English token to let the user know which one the user just used, a static parameter such as "user=josh" may be included and that static parameter would be sent along with the other data the user requests. If the user would like to send more than one static parameter, the user may use an "&" between each pair (e.g., name1=value1&name2=value2&name3=value3).

Dynamic Parameters

The actual data about the phone call that gets sent to the user's server are contained in the dynamic parameters 1478. A user can specify what information the user wants to receive and how it will be labeled.

To add a dynamic parameter, a user may click the green plus button 1479, select one of the parameters from the drop-down menu 1480, and then enter a name for this parameter. The name will be the key for this parameter and what the user will use to access it when the data is transmitted to the user's web server.

Below the parameters, a hyperlink (not shown) may be displayed of what the URL that gets submitted to the user's server may look like. The user can click the link to test the Post Call Action.

When a call completes the actual date/time of when the call started and the caller ID will be sent to the URL the user specifies. The following examples of dynamic parameters are explained below.

Date/Time—Date and time the call started.
Call Type—Inbound, Outbound, Click-To, etc.
First Action—The first action to handle the call such as a Virtual Receptionist.
Last Action—The last action taken on a call.
All Actions—List of all actions taken.
Click Description—The description (name) of the Click-to-Call that initiated the call if applicable.
Click ID—The ID of the Click-to-Call that initiated the call if applicable.
Called Number—Which of the user's local or toll free numbers was dialed.
Caller ID—The phone number of the person who called.
Intelligent Minutes—Time spent in a Find Me or Virtual Receptionist waiting to connect the call.
Talk Minutes—Time spent while two parties are connected.
Enhanced Minutes—Talk minutes if the call is recorded.
Rounded Intelligent Minutes—Same as above but rounded up.
Rounded Talk Minutes—Same as above but rounded up.
Rounded Enhanced Minutes—Same as above but rounded up.
Call Duration—The length of the call in minutes.
Transfer Type—If the call is transferred using a Virtual Receptionist, Click-to-XYZ, etc.
Transferred to Number—If the call is transferred the number it was transferred to.

The Post Call Action tool lifts its functionality directly from the "Net Integration" feature found within SurVo, but expands upon it for a powerfully diverse and dynamic enhancement to each and every call, regardless of their nature and composition. The goal of Post Call Action is to give customers real-time data collection abilities for calls as they complete, with a myriad of call detail information at their fingertips. The first version of this tool provides access to all pertinent information found in the Call Detail Report 2.0. Functionally, the Post Call Action interface assists the customer to generate a fully-qualified web URL which is then "filled in" with the dynamic information corresponding to the call that the customer wants and launching a "REST" API call to a specified web server. This will deliver the desired data in near real-time as each call completes. The data reported by a Post Call Action can be simple or complicated, with virtually limitless possibilities—a powerful capability leveraging the same everyday technology used the world over to surf the web.

As noted above, calls can have multiple Post Call Actions, further empowering any and all interested parties with only the information they need. Post Call Action gives the user the ability to specify "dynamic parameters" in the URL that act as placeholders for call specific data. These so-called placeholders are chosen in the Post Call Action configuration interface from a dynamically-generated list based on the value of the "Post Call Action Option" drop-down list. It is as easy as adding a new dynamic parameter, inputting an identifier for it in the newly available text box, and choosing one of the dynamic placeholder values from the corresponding drop-down list. When a Post Call Action is executed, these placeholder values are first substituted with the corresponding pieces of call-specific information before the process is completed. As many or as few of the available placeholders can be used, in any order.

To further assist in maximizing the benefit of a Post Call Action, the system provides a simple tool to debug web applications that accept the data sent by a Post Call Action through a testing interface. It is as simple as filling in mock data corresponding to the parameters the external web application expects and initiating the test.

Depending on the nature of the web application, output may be displayed as the test concludes to ensure that everything flows as it should between the system and the defined off-site location. The following options can be found in the interface:

Post Call Action Name: Specifies an interface identifier for the Post Call Action, for future editing, testing, and removal purposes.

Active: Specifies whether or not this Post Call Action will be executed at the end of each call.

Post Call Action Option: Specifies the set of dynamic parameter placeholder values that are available for selection in the dynamic parameter section.

Submit Type: Specifies whether the Post Call Action is executed as an HTTP "GET" or "POST" request to the target web server.

Domain: Specifies the mandatory HTTP scheme (http:// or https://), optional username/password combination, mandatory domain name, and optional port—compliant with RFC 3986 standards.

Static Parameters: Specifies any number of equal-separated (=) key/value pairs of URL variables with unchanging variables that should be a part of the Post Call Action URL, each completed pair separated by ampersands (&)—optional and completely dependent upon the nature and use of the Post Call Action.

Dynamic Parameters: Specifies any number of dynamically configured placeholder values for dynamic call data, based on the value chosen from "Post Call Action Option".

Completed URL: Visually represents the completed Post Call Action URL, with dynamic placeholders visible. The URL can be clicked to initiate a live test to ensure that it interoperates with the target web server as expected.

Reload Post Call Action: If editing a pre-existing Post Call Action, this button will "refresh" the data on the page to reflect the saved values, undoing any changes made since loading the page.

Integration with Salesforce.com

Sales force automation (SFA) applications support the automation of sales activities, processes and administrative responsibilities for business-to-business (B2B) organizations' sales professionals. Core functionalities may include account, contact and opportunity management. Additional add-on capabilities focus on improving the sales effectiveness of salespeople, such as sales configuration, guided selling, proposal generation and content management, and sales performance management support, including incentive compensation, quota, sales coaching and territory management.

Salesforce.com is the leader in the SFA market, according to Gartner's *Magic Quadrant for Sales Force Automation* (published Jul. 18, 2012). The main reasons customers choose salesforce.com is strong brand, innovation and proven track record. Accordingly, it would be desirable for the system, methods, and computer program products for tracking customer calls according to embodiments of the present invention to be integrated with SFA tools such as Salesforce.com.

Figures 15A, 15B:
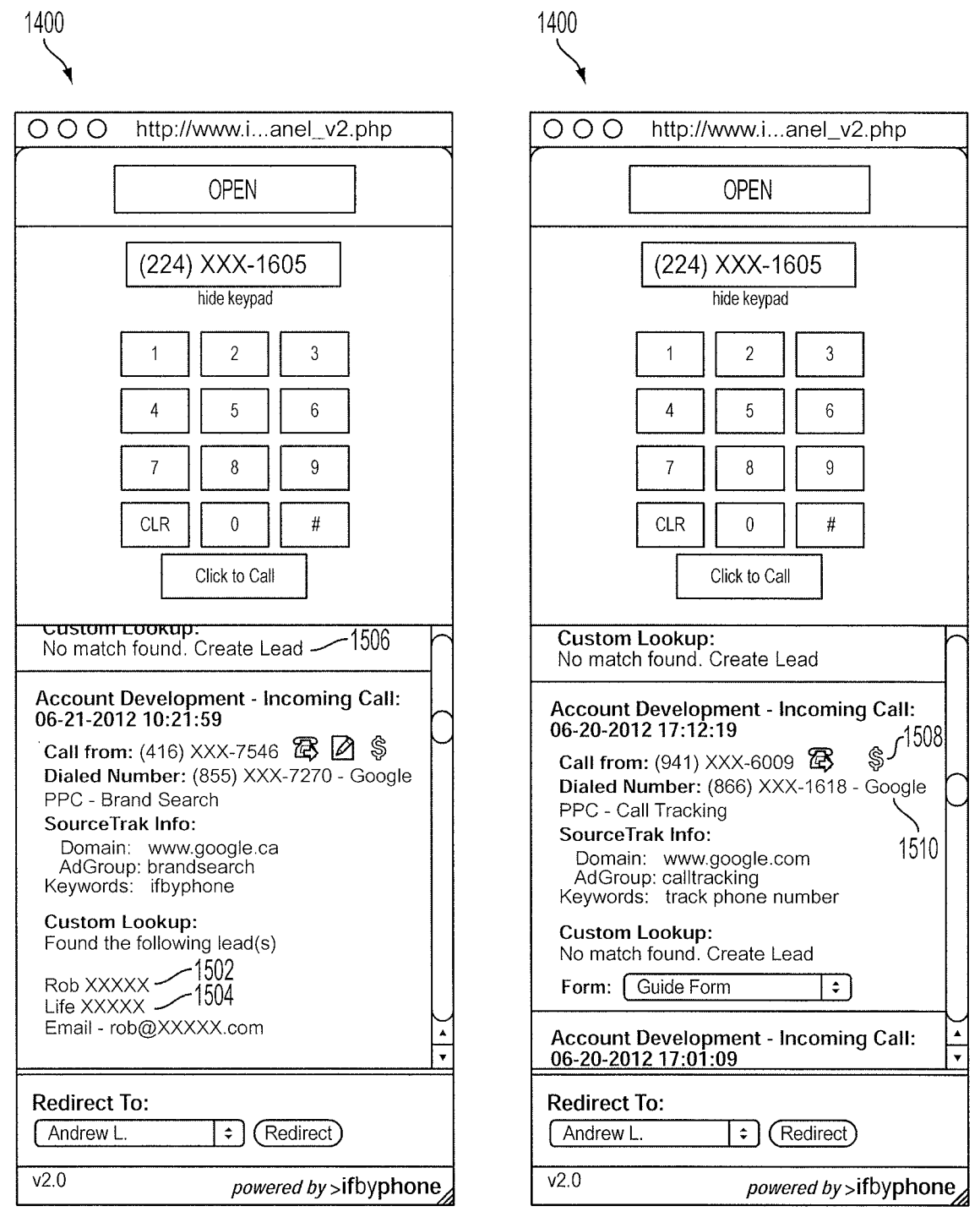

Ifbyphone for Salesforce.com is designed to work in conjunction with tracking set (e.g., SOURCETRAK®) application 150, including the call distributor module 260. When the caller ID of an incoming call matches an existing Salesforce record, as shown in FIGS. 15A and 15B, a Call Distributor agent can click on the Contact 1502 or Organization 1504 name in the agent panel 1400 to bring up either record. If no record is found, a "Create Lead" link 1506 is displayed to create a new Lead record. Application 150 automatically populates the lead source 1508, phone number 1510 and tracking set (e.g., SOURCETRAK®) information 1512.

Figure 16:
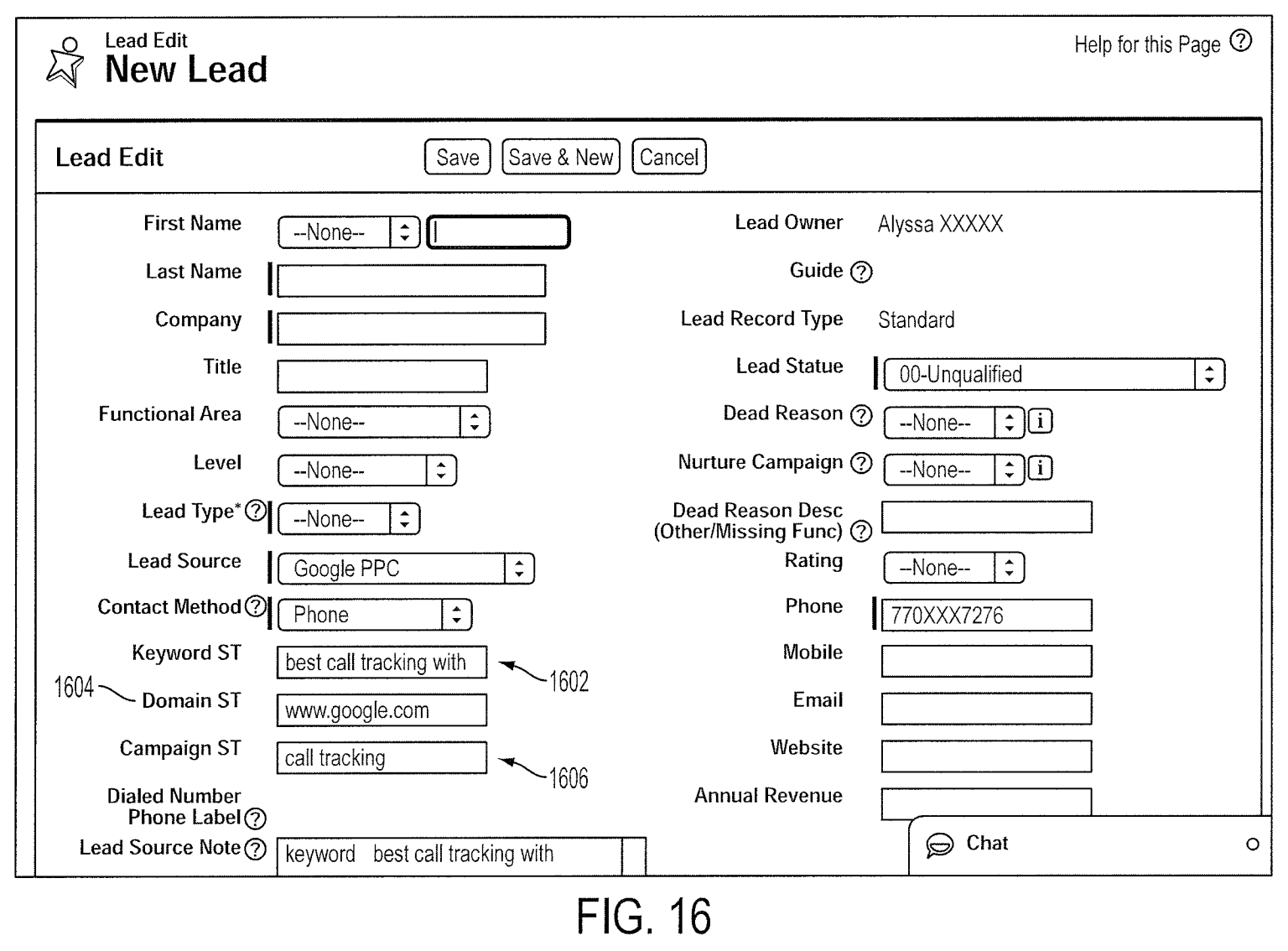

The system 100 also automatically populates new lead records with the caller's phone number and lead source information, as shown in FIG. 16. Data from the tracking set (e.g., SOURCETRAK®) application 150 tracks the online search keywords 1602, domain name 1604, and Google AdWords campaign 1606 that drove the lead to call the user's business.

If a call comes in from a new lead and is unanswered, Ifbyphone for Salesforce.com automatically creates a new lead, populates the phone number, and creates a case for follow-up. If the phone number is recognized, a new case is created and associated with the appropriate organization. Customers can use the lead source and tracking set (e.g., SOURCETRAK®) information to generate reports that measure the effectiveness of online and offline marketing activity.

For example, the Ifbyphone Manager Control Panel (FIG. 17) may show agent-level status and performance metrics. Overall queue statistics and call results may be automatically refreshed every minute.

Unanswered calls may be used to automatically create new cases (FIG. 18) in Salesforce to ensure businesses never miss a lead. If the Caller ID matches a contact, the case will be associated with that contact. If the number is unknown, a new Lead will be created.

As an alternative to the embodiments shown in FIGS. 1 and 3, application 150 may be utilized in the form of software or infrastructure as a service in the "cloud computing" environment. As is known, the term "cloud computing" refers to a computing paradigm in which tasks are assigned to a combination of connections, software and services accessed over a network. This network of servers and connections is collectively known as "the cloud." Computing at the scale of the cloud allows users to access supercomputer-level power. Using a thin client or other access point (e.g., an iPhone, BlackBerry or laptop), users can reach into the cloud for resources as they need them. For this reason, cloud computing has also been described as "on-demand computing."

This vast processing power is made possible though distributed, large-scale cluster computing, often in concert with server virtualization software (e.g., Xen) and parallel processing. Cloud computing can be contrasted with the traditional desktop computing model, where the resources of a single desktop computer are used to complete tasks, and an expansion of the client/server model.

Calls using the system may be tracked to a sale. The call distributor module 260 captures the sale and callback engine 250. In such instances, the sold account may be matched to its last phone number, and a "call me back" or "SMS me back" feature may be implemented. When application 150 includes the call distributor module 260, such features will be shown in the agent panel 1400. When application 150 does not include call distributor module 260, the dollar sign 1460 (FIG. 14C) may be clicked by the agent to determine such sales.

Cloud computing is often used to sort through enormous amounts of data, such as large call centers. In fact, Google has an initial edge in cloud computing precisely because of its need to produce instant, accurate results for millions of incoming search inquires every day, parsing through the terabytes of Internet data cached on its servers. Google's approach has been to design and manufacture hundreds of thousands of its own servers from commodity components, connecting relatively inexpensive processors in parallel to create an immensely powerful, scalable system. Google Apps, Maps and Gmail are all based in the cloud. Integration of the application 150 described herein would be easily integrated with services such as Google Analytics in the cloud.

In alternative embodiments, hardwired circuitry may be used in place of or in combination with software instructions to implement features consistent with principles of the invention. Thus, implementations consistent with principles of the invention are not limited to any specific combination of hardware circuitry and software.

Exemplary embodiments may be embodied in many different ways as a software component. For example, it may be a stand-alone software package, a combination of software packages, or it may be a software package incorporated as a "tool" in a larger software product. It may be downloadable from a network, for example, a website, as a stand-alone product or as an add-in package for installation in an existing software application. It may also be available as a client-server software application, or as a Web-enabled software application. It may also be embodied as a software package installed on a hardware device.

As noted above, application 150 could likewise be used with phones 130 using VoIP. Local number portability (LNP) and mobile number portability (MNP) also impact VoIP business. In November 2007, the Federal Communications Commission in the United States released an order extending number portability obligations to interconnected VoIP providers and carriers that support VoIP providers. Number portability is a service that allows a subscriber to select a new telephone carrier without requiring a new number to be issued. Typically, it is the responsibility of the former carrier to "map" the old number to the undisclosed number assigned by the new carrier. This is achieved by maintaining a database of numbers. A dialed number is initially received by the original carrier and quickly rerouted to the new carrier. Multiple porting references must be maintained even if the subscriber returns to the original carrier. The FCC mandates carrier compliance with these consumer-protection stipulations.

A voice call originating in the VoIP environment also faces challenges to reach its destination if the number is routed to a mobile phone number on a traditional mobile carrier. VoIP has been identified in the past as a Least Cost Routing (LCR) system, which is based on checking the destination of each telephone call as it is made, and then sending the call via the network that will cost the customer the least. This rating is subject to some debate given the complexity of call routing created by number portability. With GSM number portability now in place, LCR providers can no longer rely on using the network root prefix to determine how to route a call. Instead, they must now determine the actual network of every number before routing the call.

Therefore, VoIP solutions also need to handle MNP when routing a voice call. In countries without a central database, like the United Kingdom, it might be necessary to query the GSM network about which home network a mobile phone number belongs to. As the popularity of VoIP increases in the enterprise markets because of least cost routing options, it needs to provide a certain level of reliability when handling calls.

MNP checks are also important to assure that this quality of service is met. By handling MNP lookups before routing a call and by assuring that the voice call will actually work, VoIP service providers are able to offer business subscribers the level of reliability they require.

Thus, it may be necessary to adapt application 150 to log and display data relating to phones 130 which use VoIP. Such data may include identification of the home network, home address, foreign network, care-of address, home agent, foreign agent, and binding.

As is known, the "home network" a mobile device is the network within which the device receives its identifying IP address (i.e., home address), which is the IP address assigned to the device within its home network. In contrast, a "foreign network" is the network in which a mobile node is operating when away from its home network. The "care-of address" of a mobile device is the network-native IP address of the device when operating in a foreign network. A "home agent" is a router on a mobile node's home network which tunnels datagrams for delivery to the mobile node when it is away from home. It maintains current location (i.e., IP address) information for the mobile node, and may be used with one or more foreign agents. A "foreign agent" is a router that stores information about mobile nodes visiting its network. Foreign agents also advertise care-of-addresses which are used by Mobile IP. A "binding" is the association of the home address with a care-of address. All of this information relating to VoIP-based phones 130 may be valuable to users of application 150, particularly in an eCommerce mobile tracking environment.

While various exemplary embodiments have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A cross-channel customer relationship management system coupled to Internet, the customer relationship management system for displaying different telephone numbers based on a search term or a referring domain used to navigate to a user's webpage, the cross-channel customer relationship management system comprising:
    at least one application server including software for matching and tracking incoming voice calls received over the Internet or a telephone network at a customer relations call center, wherein the incoming voice calls are made to telephone numbers displayed on websites viewed by one or more visitors to those websites over the Internet
    wherein the at least one application server includes a tracking sets module that contains configuration information about which telephone number to display on a website based on referral source information for a source of a visitor's visit to that website via the Internet,
    wherein the referral source information includes at least a domain of a referring web page that is the referral source for the visitor's visit via the Internet, a search string extrapolated from a URL of the referring web page through which the visitor's visit occurred via the Internet, and a tag appended to a URL of the referring web page through which the visitor's visit occurred via the Internet,
    wherein the tracking sets module configuration information includes a set of rules that match the referral source information to a telephone number or group of telephone numbers that were previously assigned to the referral source information in the tracking sets module configuration information prior to the visitor's visit for display on the website,
    wherein the tracking sets module uses the set of rules to determine which of the voice call telephone numbers to dynamically display to the visitor on the website and dynamically displays the determined voice call telephone number via the Internet to facilitate cross-channel customer relationship management for communication via the Internet and a voice call, based on the referral source information for the visitor's website visit; wherein the set of dynamic display rules includes:
    associating the tag appended to the URL with a predetermined pool of the voice call telephone numbers associated with a predefined set of defined referral sources in a dynamic group so that the cross-channel relationship management system inserts a new voice call telephone number from the pool of voice call telephone numbers to each website visitor having the one of the set of defined referral sources, and
    associating undefined referral sources with another pool of voice call telephone numbers so that the cross-channel relationship management system inserts a new voice call telephone number from the another pool of voice call telephone numbers to each website visitor having the undefined referral sources, inserting a predetermined voice call telephone number in the website in response to a determination that the referral source is unknown,
    wherein an application running on the at least one application server and being coupled to the tracking sets module comprises a logging engine and a logic engine; and
    a database coupled to the application running on the at least one application server and receiving, storing, and sending data about the visitor's website visit via the Internet to the logging engine, the data indicating the referral source information associated with display of at least one of the voice call telephone numbers,
    wherein the logging engine receives at least one incoming voice call to at least one of the voice call telephone numbers displayed on the website and collects data associated with each of the incoming calls, and
    wherein the logic engine determines whether each incoming voice call matches the referral source information for the website by determining whether the called telephone number is in a tracking set stored in the tracking sets module, and
    wherein the incoming voice call is connected via a call distributor to an agent and the collected data associated with the incoming voice call is displayed to an agent prior, the collected data comprising referral source information.

2. The system of claim 1, wherein the logic engine does not match the called telephone number with a visitor when the called telephone number is not in a stored tracking set.

3. The system of claim 1, wherein the logic engine does not match the called telephone number with a visitor when the called telephone number is in a stored tracking set but not associated with a defined referral source.

4. The system of claim 1, the logic engine attempts to match the called telephone number with a visitor when the called telephone number is in a pool associated with defined referral sources of-the stored tracking set.

5. The system of claim 4, wherein when the caller ID and the called telephone number matches a previous call within a duplicate call threshold time period, the logic engine matches the incoming call with the previous call visitor.

6. The system of claim 5, wherein threshold is time and the called telephone number is not matched with a visitor when the time elapsed between display of the phone number and the incoming call is exceeded.

7. The system of claim 1, wherein the one of the telephone numbers displayed to the visitor is unique to the user for a defined time period following display of the one phone number via the website.

8. The system of claim 1, further comprising a sales force automation tool configured to be integrated with the application.

9. A method for matching and tracking incoming calls over a cross-channel customer relationship management system coupled to Internet, the customer relationship management system for displaying different telephone numbers based on a search term or a referring domain used to navigate to a user's webpage, the method comprising:
    providing a tracking sets module on an application server that contains configuration information about which telephone number to display on a website based on referral source information for a source of a visitor's visit to that website, wherein the referral source information includes at least a domain of a referring web page that is the referral source for the visitor's visit via the Internet, a search string extrapolated from a URL of the referring web page through which the visitor's visit occurred via the Internet, and a tag appended to a URL of the referring web page through which the visitor's visit occurred via the Internet, wherein the tracking sets module also contains a set of rules that match the referral source information to a telephone number or group of telephone numbers for display on the website, wherein the tracking sets module uses the set of rules to determine which of the phone numbers to display to the visitor on the website based on the referral source information for the visitor's website visit that were previously assigned to the referral source information in the tracking sets module configuration information prior to the visitor's visit;

wherein the set of rules includes:

associating the tag appended to the URL with a predetermined telephone number so that the predetermined telephone number is inserted in that particular website in response to the visitor visiting the particular website from a particular referring webpage, associating a predefined set of defined referral sources with a pool of telephone numbers so that the cross-channel relationship management system inserts a new phone number from the dynamic group to each website visitor having the defined referral sources in response to the visitor visiting the particular website having and having one of the set of defined referral sources, and associating undefined referral sources with another pool of phone numbers so that the system inserts a new telephone number from the another pool of voice call telephone numbers to each website visitor having the undefined referral sources, inserting a predetermined voice call telephone number in the website in response to a determination that the referral source is unknown, and providing an application comprising a logging engine and a logic engine, each of which is associated with the website, receiving, storing, and sending data about the visitor's website visit via a database to the logging engine, the data indicating the referral source information associated with display of at least one of the telephone numbers wherein, in response to the one or more users calling phone numbers to initiate an incoming voice call:

collecting the data associated with each of the incoming voice calls; and determining whether each incoming voice call matches the referral source information for the website by determining whether the called phone number is in a tracking set stored in the tracking sets module, wherein the incoming voice call is connected via a call distributor to an agent and the collected data associated with the incoming voice call is displayed to an agent, the collected data comprising referral source information.

10. The method of claim 9, wherein the one of the telephone numbers displayed to the visitor is unique to the user for a defined time period.

11. The method of claim 9, further comprising:

providing a sales force automation (SFA) tool; and coupling the SFA tool to said database; and automatically populating the SFA tool with the data collected by the logging engine.

* * * * *